(12) United States Patent
Van Horn et al.

(10) Patent No.: US 11,282,323 B2
(45) Date of Patent: *Mar. 22, 2022

(54) DEVICES, SYSTEMS, AND METHODS FOR OPTICAL VALIDATION

(71) Applicant: Hand Held Products, Inc., Fort Mill, SC (US)

(72) Inventors: Erik Van Horn, Ocean View, NJ (US); Gennady Germaine, Cherry Hill, NJ (US); Christopher Allen, East Windsor, NJ (US); David J. Ryder, Summit, NJ (US); Paul Poloniewicz, Doylestown, PA (US); Kevin Saber, Sewell, NJ (US); Sean Philip Kearney, Marlton, NJ (US); Edward Hatton, Kanata (CA); Edward C. Bremer, Victor, NY (US); Michael Vincent Miraglia, Hamilton, NJ (US); Robert Pierce, West Berlin, NJ (US); William Ross Rapoport, Bridgewater, NJ (US); James Vincent Guiheen, Madison, NJ (US); Chirag Patel, Bridgewater, NJ (US); Patrick Anthony Giordano, Glassboro, NJ (US); Timothy Good, Indian Land, SC (US); Gregory M. Rueblinger, Stratford, NJ (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/414,477

(22) Filed: May 16, 2019

(65) Prior Publication Data

US 2019/0272696 A1    Sep. 5, 2019

Related U.S. Application Data

(63) Continuation of application No. 15/388,082, filed on Dec. 22, 2016, now Pat. No. 10,325,436.

(Continued)

(51) Int. Cl.
*G07D 7/2033* (2016.01)
*G06K 7/015* (2006.01)
(Continued)

(52) U.S. Cl.
CPC ........... *G07D 7/2033* (2013.01); *G06K 7/015* (2013.01); *G06K 7/10732* (2013.01);
(Continued)

(58) Field of Classification Search
None
See application file for complete search history.

(56) References Cited

U.S. PATENT DOCUMENTS

| 5,149,948 A | 9/1992 | Chisholm |
| 5,233,197 A | 8/1993 | Bowman et al. |

(Continued)

FOREIGN PATENT DOCUMENTS

| EP | 2927840 A1 | 10/2015 |
| KR | 10-1117359 B1 | 3/2012 |

(Continued)

OTHER PUBLICATIONS

Kanwal, Navjot Kaur, Divya Jat, and Manish Malhotra. "Spectral analysis of various security features in the Indian currency note of highest denomination using Video Spectral Comparator-40." International Journal of Innovative Science Engineering and Technology 2.11 (2015): 823-842. (Year: 2015).*

(Continued)

*Primary Examiner* — Vu Le
*Assistant Examiner* — Tracy Mangialaschi
(74) *Attorney, Agent, or Firm* — Alston & Bird LLP

(57) ABSTRACT

Existing currency validation (CVAL) devices, systems, and methods are too slow, costly, intrusive, and/or bulky to be routinely used in common transaction locations (e.g., at checkout, at an automatic teller machine, etc.). Presented herein are devices, systems, and methods to facilitate optical validation of documents, merchandise, or currency at common transaction locations and to do so in an obtrusive and convenient way. More specifically, the present invention embraces a validation device that may be used alone or integrated within a larger system (e.g., point of sale system, kiosk, etc.). The present invention also embraces methods for currency validation using the validation device, as well as methods for improving the quality and consistency of data captured by the validation device for validation.

19 Claims, 13 Drawing Sheets

Related U.S. Application Data

(60) Provisional application No. 62/273,493, filed on Dec. 31, 2015.

(51) Int. Cl.

| | | |
|---|---|---|
| *G06K 7/10* | (2006.01) | |
| *G07D 7/0043* | (2016.01) | |
| *G07D 7/202* | (2016.01) | |
| *G07D 7/206* | (2016.01) | |
| *G07G 1/00* | (2006.01) | |
| *G07G 3/00* | (2006.01) | |
| *G07D 7/12* | (2016.01) | |
| *G07D 7/20* | (2016.01) | |

(52) U.S. Cl.
CPC ............ *G07D 7/0043* (2017.05); *G07D 7/12* (2013.01); *G07D 7/202* (2017.05); *G07D 7/206* (2017.05); *G07D 7/2016* (2013.01); *G07G 1/0018* (2013.01); *G07G 3/00* (2013.01); *G07D 2207/00* (2013.01)

(56) References Cited

U.S. PATENT DOCUMENTS

| | | | |
|---|---|---|---|
| 5,304,813 A | 4/1994 | De Man | |
| 5,541,419 A | 7/1996 | Arackellian | |
| 5,855,268 A | 1/1999 | Zoladz, Jr. | |
| 5,918,960 A | 7/1999 | Hopwood et al. | |
| 6,082,775 A | 7/2000 | Phillips | |
| 6,219,158 B1 | 4/2001 | Dawe | |
| 6,550,671 B1* | 4/2003 | Brown ............... | G07D 11/0087 235/379 |
| 6,741,727 B1 | 5/2004 | Hirasawa | |
| 6,832,425 B2 | 12/2004 | Taylor et al. | |
| 6,832,725 B2 | 12/2004 | Gardiner et al. | |
| 6,832,729 B1* | 12/2004 | Perry ................. | G06K 7/10881 235/462.45 |
| 6,848,561 B2 | 2/2005 | Bao | |
| 7,128,266 B2 | 10/2006 | Zhu et al. | |
| 7,159,783 B2 | 1/2007 | Walczyk et al. | |
| 7,387,246 B2 | 6/2008 | Palestini et al. | |
| 7,413,127 B2 | 8/2008 | Ehrhart et al. | |
| 7,454,049 B2 | 11/2008 | Paraskevakos | |
| 7,584,890 B2 | 9/2009 | Mazowiesky et al. | |
| 7,620,359 B2 | 11/2009 | Gardner et al. | |
| 7,684,607 B2 | 3/2010 | Joshi et al. | |
| 7,726,575 B2 | 6/2010 | Wang et al. | |
| 8,194,237 B2 | 6/2012 | Cronin et al. | |
| 8,260,027 B2 | 9/2012 | Nireki | |
| 8,290,236 B2 | 10/2012 | Lett et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,333,323 B2 | 12/2012 | Richardson et al. | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,411,177 B2 | 4/2013 | Giebel | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |

(56) References Cited

U.S. PATENT DOCUMENTS

| | | |
|---|---|---|
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,786,839 B2 | 7/2014 | Cronin et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,931,696 B2 | 1/2015 | Hood |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van et al. |
| D766,244 S | 9/2016 | Zhou et al. |

(56) References Cited

U.S. PATENT DOCUMENTS

| | | | |
|---|---|---|---|
| 9,443,123 | B2 | 9/2016 | Hejl |
| 9,443,222 | B2 | 9/2016 | Singel et al. |
| 9,478,113 | B2 | 10/2016 | Xie et al. |
| D771,631 | S | 11/2016 | Fitch et al. |
| 9,507,974 | B1 | 11/2016 | Todeschini |
| D777,166 | S | 1/2017 | Bidwell et al. |
| D783,601 | S | 4/2017 | Schulte et al. |
| D785,617 | S | 5/2017 | Bidwell et al. |
| D785,636 | S | 5/2017 | Oberpriller et al. |
| D790,505 | S | 6/2017 | Vargo et al. |
| D790,546 | S | 6/2017 | Zhou et al. |
| D790,553 | S | 6/2017 | Fitch et al. |
| 9,786,101 | B2 | 10/2017 | Ackley |
| 9,857,167 | B2 | 1/2018 | Jovanovski et al. |
| 9,891,612 | B2 | 2/2018 | Charpentier et al. |
| 9,892,876 | B2 | 2/2018 | Bandringa |
| 9,954,871 | B2 | 4/2018 | Hussey et al. |
| 9,978,088 | B2 | 5/2018 | Pape |
| 10,007,112 | B2 | 6/2018 | Fitch et al. |
| 10,038,716 | B2 | 7/2018 | Todeschini et al. |
| 10,066,982 | B2 | 9/2018 | Ackley et al. |
| 10,360,728 | B2 | 7/2019 | Venkatesha et al. |
| 10,401,436 | B2 | 9/2019 | Young et al. |
| 2003/0030785 | A1* | 2/2003 | Christophersen ........ G07D 7/12 356/71 |
| 2003/0098350 | A1* | 5/2003 | Liou ...................... G07D 7/128 235/462.25 |
| 2004/0240722 | A1* | 12/2004 | Tsuji ...................... G07D 7/121 382/137 |
| 2007/0063048 | A1 | 3/2007 | Havens et al. |
| 2008/0099561 | A1 | 5/2008 | Douma |
| 2008/0137080 | A1 | 6/2008 | Bodzin et al. |
| 2009/0073503 | A1 | 3/2009 | Lebaschi et al. |
| 2009/0134221 | A1 | 5/2009 | Zhu et al. |
| 2010/0177076 | A1 | 7/2010 | Essinger et al. |
| 2010/0177080 | A1 | 7/2010 | Essinger et al. |
| 2010/0177707 | A1 | 7/2010 | Essinger et al. |
| 2010/0177749 | A1 | 7/2010 | Essinger et al. |
| 2011/0169999 | A1 | 7/2011 | Grunow et al. |
| 2011/0202554 | A1 | 8/2011 | Powilleit et al. |
| 2012/0081011 | A1 | 4/2012 | Wilsher |
| 2012/0111946 | A1 | 5/2012 | Golant |
| 2012/0168512 | A1 | 7/2012 | Kotlarsky et al. |
| 2012/0193423 | A1 | 8/2012 | Samek |
| 2012/0203647 | A1 | 8/2012 | Smith |
| 2012/0223141 | A1 | 9/2012 | Good et al. |
| 2013/0034290 | A1* | 2/2013 | Lee ...................... G07D 7/202 382/135 |
| 2013/0043312 | A1 | 2/2013 | Van Horn |
| 2013/0075168 | A1 | 3/2013 | Amundsen et al. |
| 2013/0175341 | A1 | 7/2013 | Kearney et al. |
| 2013/0175343 | A1 | 7/2013 | Good |
| 2013/0257744 | A1 | 10/2013 | Daghigh et al. |
| 2013/0257759 | A1 | 10/2013 | Daghigh |
| 2013/0270346 | A1 | 10/2013 | Xian et al. |
| 2013/0287258 | A1 | 10/2013 | Philip |
| 2013/0292475 | A1 | 11/2013 | Kotlarsky et al. |
| 2013/0292477 | A1 | 11/2013 | Hennick et al. |
| 2013/0293539 | A1 | 11/2013 | Hunt et al. |
| 2013/0293540 | A1 | 11/2013 | Laffargue et al. |
| 2013/0306728 | A1 | 11/2013 | Thuries et al. |
| 2013/0306731 | A1 | 11/2013 | Pedrao |
| 2013/0307964 | A1 | 11/2013 | Bremer et al. |
| 2013/0308625 | A1 | 11/2013 | Park et al. |
| 2013/0313324 | A1 | 11/2013 | Koziol et al. |
| 2013/0313325 | A1 | 11/2013 | Wilz et al. |
| 2013/0342717 | A1 | 12/2013 | Havens et al. |
| 2014/0001267 | A1 | 1/2014 | Giordano et al. |
| 2014/0002828 | A1 | 1/2014 | Laffargue et al. |
| 2014/0008439 | A1 | 1/2014 | Wang |
| 2014/0025584 | A1 | 1/2014 | Liu et al. |
| 2014/0034734 | A1 | 2/2014 | Sauerwein, Jr. |
| 2014/0036848 | A1 | 2/2014 | Pease et al. |
| 2014/0037196 | A1 | 2/2014 | Blair |
| 2014/0039693 | A1 | 2/2014 | Havens et al. |
| 2014/0042814 | A1 | 2/2014 | Kather et al. |
| 2014/0049120 | A1 | 2/2014 | Kohtz et al. |
| 2014/0049635 | A1 | 2/2014 | Laffargue et al. |
| 2014/0061306 | A1 | 3/2014 | Wu et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0076974 | A1 | 3/2014 | Havens et al. |
| 2014/0078341 | A1 | 3/2014 | Havens et al. |
| 2014/0078342 | A1 | 3/2014 | Li et al. |
| 2014/0078345 | A1 | 3/2014 | Showering |
| 2014/0098792 | A1 | 4/2014 | Wang et al. |
| 2014/0100774 | A1 | 4/2014 | Showering |
| 2014/0100813 | A1 | 4/2014 | Showering |
| 2014/0103115 | A1 | 4/2014 | Meier et al. |
| 2014/0104413 | A1 | 4/2014 | McCloskey et al. |
| 2014/0104414 | A1 | 4/2014 | McCloskey et al. |
| 2014/0104416 | A1 | 4/2014 | Giordano et al. |
| 2014/0104451 | A1 | 4/2014 | Todeschini et al. |
| 2014/0106594 | A1 | 4/2014 | Skvoretz |
| 2014/0106725 | A1 | 4/2014 | Sauerwein, Jr. |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0112570 | A1* | 4/2014 | Ross ...................... G07D 7/12 382/137 |
| 2014/0114530 | A1 | 4/2014 | Fitch et al. |
| 2014/0124577 | A1 | 5/2014 | Wang et al. |
| 2014/0124579 | A1 | 5/2014 | Ding |
| 2014/0125842 | A1 | 5/2014 | Winegar |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131438 | A1 | 5/2014 | Kearney |
| 2014/0131441 | A1 | 5/2014 | Nahill et al. |
| 2014/0131443 | A1 | 5/2014 | Smith |
| 2014/0131444 | A1 | 5/2014 | Wang |
| 2014/0131445 | A1 | 5/2014 | Ding et al. |
| 2014/0131448 | A1 | 5/2014 | Xian et al. |
| 2014/0133379 | A1 | 5/2014 | Wang et al. |
| 2014/0136208 | A1 | 5/2014 | Maltseff et al. |
| 2014/0140585 | A1 | 5/2014 | Wang |
| 2014/0151453 | A1 | 6/2014 | Meier et al. |
| 2014/0152882 | A1 | 6/2014 | Samek et al. |
| 2014/0158770 | A1 | 6/2014 | Sevier et al. |
| 2014/0159639 | A1 | 6/2014 | Miller et al. |
| 2014/0159869 | A1 | 6/2014 | Zumsteg et al. |
| 2014/0166755 | A1 | 6/2014 | Liu et al. |
| 2014/0166757 | A1 | 6/2014 | Smith |
| 2014/0166759 | A1 | 6/2014 | Liu et al. |
| 2014/0168787 | A1 | 6/2014 | Wang et al. |
| 2014/0175165 | A1 | 6/2014 | Havens et al. |
| 2014/0175172 | A1 | 6/2014 | Jovanovski et al. |
| 2014/0191644 | A1 | 7/2014 | Chaney |
| 2014/0191913 | A1 | 7/2014 | Ge et al. |
| 2014/0197238 | A1 | 7/2014 | Liu et al. |
| 2014/0197239 | A1 | 7/2014 | Havens et al. |
| 2014/0197304 | A1 | 7/2014 | Feng et al. |
| 2014/0203087 | A1 | 7/2014 | Smith et al. |
| 2014/0204268 | A1 | 7/2014 | Grunow et al. |
| 2014/0214631 | A1 | 7/2014 | Hansen |
| 2014/0217166 | A1 | 8/2014 | Berthiaume et al. |
| 2014/0217180 | A1 | 8/2014 | Pengfei |
| 2014/0231500 | A1 | 8/2014 | Ehrhart et al. |
| 2014/0232930 | A1 | 8/2014 | Anderson |
| 2014/0247315 | A1 | 9/2014 | Marty et al. |
| 2014/0263493 | A1 | 9/2014 | Amurgis et al. |
| 2014/0263645 | A1 | 9/2014 | Smith et al. |
| 2014/0270196 | A1 | 9/2014 | Braho et al. |
| 2014/0270229 | A1 | 9/2014 | Braho |
| 2014/0278387 | A1 | 9/2014 | Digregorio |
| 2014/0282210 | A1 | 9/2014 | Thomas |
| 2014/0284384 | A1 | 9/2014 | Lu et al. |
| 2014/0288933 | A1 | 9/2014 | Braho et al. |
| 2014/0297058 | A1 | 10/2014 | Barker et al. |

(56) References Cited

U.S. PATENT DOCUMENTS

| | | |
|---|---|---|
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0109643 A1* | 4/2015 | Auger .......... G06K 19/0614 358/448 |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2015/0348350 A1* | 12/2015 | Collins, Jr. .......... G07D 7/12 382/135 |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0163142 A1 | 6/2016 | Auger |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0307035 A1 | 10/2016 | Schilling et al. |
| 2016/0314276 A1 | 10/2016 | Wilz et al. |
| 2016/0314294 A1 | 10/2016 | Kubler et al. |
| 2016/0377414 A1 | 12/2016 | Thuries et al. |

FOREIGN PATENT DOCUMENTS

| | | |
|---|---|---|
| WO | 2013/163789 A1 | 11/2013 |
| WO | 2013/173985 A1 | 11/2013 |
| WO | 2014/019130 A1 | 2/2014 |
| WO | 2014/110495 A1 | 7/2014 |
| WO | 2014/207415 A1 | 12/2014 |
| WO | 2015/021476 A1 | 2/2015 |
| WO | 2015/082332 A1 | 6/2015 |

OTHER PUBLICATIONS

Canmax CM-2D202 2D Handheld Barcode Scanner, downloaded from http://www.canmax.com.tw/product/view/CM-2D202 on Oct. 25, 2018, Copyrighted 2010 2 pages.

Canmax CM-890K10 Light Weight Android Barcode Reader, downloaded from http://www.canmax.com.tw/product/view/CM-890K10 on Oct. 25, 2018, Copyrighted 2010, 2 pages.

Cap-XX Inc., "Using Supercapacitors to Solve LED Flash Power Issues for High Resolution Camera Phones", downloaded from www.cap-xx.com website Mar. 21, 2017, 3 pages.

Jayan Thomas, University of Central Florida, "Charged Up"; published in Pegasus, The Magazine of the University of Central Florida, Spring 2015, [Downloaded from https://www.ucf.edu/pegasus/charged-up/on Mar. 21, 2017], 12 pages.

NanoMatriX, Calibrated Taggants Detection Systems, downloaded from https://www.nanomatrixsecure.com/en/security-products/inspection-systems/security-taggant-detection, on Oct. 25, 2018, 11 pages.

Search Report in related European Application No. 16207454.6 dated May 30, 2017, pp. 1-8.

U.S. Appl. No. 13/367,978, filed Feb. 7, 2012, (Feng et al.); now abandoned.

U.S. Patent Application for Terminal Having Illumination and Focus Control filed May 21, 2014 (Liu et al. ); 31 pages; now abandoned, U.S. Appl. No. 14/283,282.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al. ); 37 pages; now abandoned.

Examiner initiated interview summary (PTOL-413B) dated Feb. 19, 2019 for U.S. Appl. No. 15/388,082.

(56) References Cited

OTHER PUBLICATIONS

Examiner initiated interview summary (PTOL-413B) dated Jul. 30, 2018 for U.S. Appl. No. 15/388,082.
Non-Final Rejection dated Jul. 30, 2018 for U.S. Appl. No. 15/388,082.
Notice of Allowance and Fees Due (PTOL-85) dated Feb. 19, 2019 for U.S. Appl. No. 15/388,082.
U.S. Appl. No. 62/101,564 for Visual Graphic Aided Location Identification filed Jan. 9, 2015 (Pecorari et al.).
U.S. Appl. No. 62/101,568 for Tag Mounted Electronics Module for Distributed Headset filed Jan. 9, 2015 (Di Piazza et al.).
U.S. Appl. No. 62/101,673 for Restocking Workflow Prioritization filed Jan. 9, 2015 (Mellott et al.).
U.S. Appl. No. 62/150,352 for Systems and Methods for Imaging filed Apr. 21, 2015 (McCloskey et al.).
U.S. Appl. No. 62/174,875 for System for Controlling Lighting in an Augmented Reality Environment filed Jun. 12, 2015 (Todeschini).
U.S. Appl. No. 62/181,233 for Customizable Headset filed Jun. 18, 2015 (Vargo et al.).
U.S. Appl. No. 62/183,385 for Gesture-Controlled Computer System filed Jun. 23, 2015 (Bouchat et al.).
U.S. Appl. No. 61/807,825 for a Wearable Barcode Scanner filed Apr. 3, 2013 (Wang).
U.S. Appl. No. 62/043,728 for Gesture-Controlled Computer System filed Aug. 29, 2014 (Bouchat et al.).
U.S. Appl. No. 62/056,327 for System and Method for Workflow Management filed Sep. 26, 2014 (Geisler et al.).
U.S. Appl. No. 62/062,175 for System and Methods for Dimensioning filed Oct. 10, 2014 (McCloskey et al.).
U.S. Appl. No. 62/083,566 for Gesture-Controlled Computer System filed Nov. 24, 2014 (Bouchat et al.).
U.S. Appl. No. 62/092,141 for Information Augmented Product Guide filed Dec. 15, 2014 (Todeschini et al.).
U.S. Appl. No. 62/092,147 for Augmented Reality Virtual Product for Display filed Dec. 15, 2014 (Todeschini).
U.S. Appl. No. 62/092,156 for Augmented Reality Asset Locator filed Dec. 15, 2014 (Todeschini et al.).
U.S. Appl. No. 62/093,448 for Location Based Forklift Collision Warning, Prediction and Avoidance filed Dec. 18, 2014 (Bernhardt et al.).
U.S. Appl. No. 62/093,501 for Active Exit Sign filed Dec. 18, 2014 (McMahan et al.).
U.S. Appl. No. 62/093,535 for Flip Open Wearable Computer filed Dec. 18, 2014 (Harr).
U.S. Appl. No. 62/093,806 for Method of Identifying a Bad Battery in an Electronic Device filed Dec. 18, 2014 (Young et al.).
U.S. Appl. No. 62/093,859 for Method To Identify Bad Touch Panel With Intermittent Field Failures filed Dec. 18, 2014 (Young et al.).
U.S. Appl. No. 62/094,344 for Host Controllable Pop-Up Soft Keypads filed Dec. 19, 2014 (Roeder).
U.S. Appl. No. 62/094,442 for Intelligent Small Screen Layout and Pop-Up Keypads for Screen-Only Devices filed Dec. 19, 2014 (Roeder).
U.S. Appl. No. 62/095,089 for Conformable Hand Mount for a Mobile Scanner filed Dec. 22, 2014 (Oberpriller et al.).
U.S. Appl. No. 62/095,453 for Augmented Display and User Input System filed Dec. 22, 2014 (Todeschini).
U.S. Appl. No. 62/095,470 for Delayed Trim of Managed Nand Flash Memory in Computing Devices filed Dec. 2014 (Redondo et al.).
U.S. Appl. No. 62/095,808 for Method of Barcode Templating for Enhanced Decoding Performance filed Dec. 23, 2014 (Meier et al.).
U.S. Appl. No. 62/095,822 for Tablet Computer With Interface Channels filed Dec. 23, 2014 (Bidwell et al.).

U.S. Appl. No. 62/096,910 for Scanning Improvements for Saturated Signals Using Automatic and Fixed Gain Control Methods filed Dec. 26, 2014 (Hejl et al.).
U.S. Appl. No. 62/096,982 for Product and Location Management Via Voice Recognition filed Dec. 26, 2014 (Pecorari et al.).
U.S. Appl. No. 62/097,054 for Power Configurable Headband filed Dec. 27, 2014 (DiPiazza et al.).
U.S. Appl. No. 62/097,056 for Acceleration-Based Motion Tolerance and Predictive Decoding filed Dec. 27, 2014 (Todeschini et al.).
U.S. Appl. No. 62/097,091 for Remote Monitoring of Vehicle Diagnostic Information filed Dec. 28, 2014 (Carrasco).
U.S. Appl. No. 62/097,097 for Dynamic Check Digit Utilization Via Electronic Tag filed Dec. 28, 2014 (Pecorari et al.).
U.S. Appl. No. 62/097,356 for Symbol Based Location Identification filed Dec. 29, 2014 (Pecorari et al.).
U.S. Appl. No. 62/097,367 for Interleaving Surprise Activities in Workflow, filed Dec. 29, 2014 (Murawski et al.).
U.S. Appl. No. 62/097,411 for Confirming Product Location Using a Subset of a Product Identifier filed Dec. 29, 2014 (Mellott et al.).
U.S. Appl. No. 62/097,480 for Distributed Headset With Electronics Module filed Dec. 29, 2014 (DePiazza et al.).
U.S. Appl. No. 62/097,632 for Method of Simulating a Virtual Out-Of-Box Experience of a Packaged Product filed Dec. 30, 2014 (Todeschini et al.).
U.S. Appl. No. 62/098,012 for Method and System for Improving Barcode Scanner Performance filed Dec. 30, 2014 (Au et al.).
U.S. Appl. No. 62/098,072 for Real-Time Adjustable Window Feature for Barcode Scanning and Process of Scanning Barcode With Adjustable Window Feature filed Dec. 29, 2014 (Todeschini et al.).
U.S. Appl. No. 62/098,110 for Point-of-Sale (POS) Code Sensing Apparatus filed Dec. 30, 2014 (Good et al.).
U.S. Appl. No. 62/098,150 for Augmented Reality Vision Barcode Scanning System and Method filed Dec. 30, 2014 (Franz).
U.S. Appl. No. 62/098,201 for Visual Feedback for Code Readers filed Dec. 30, 2014 (Sailors et al.).
U.S. Appl. No. 62/098,458 for Method of User Authentication Via Virtual Object Manipulation filed Dec. 31, 2014 (Todeschini).
U.S. Appl. No. 62/098,540 for Speed-Limit-Compliance System and Method filed Dec. 31, 2014 (Chamberlin).
U.S. Appl. No. 62/098,643 for Industrial Vehicle Positioning System and Method filed Dec. 31, 2014 (Chamberlin et al.).
U.S. Appl. No. 62/098,676 for Reclosable Strap Assembly filed Dec. 31, 2014 (Oberpriller et al.).
U.S. Appl. No. 62/098,708 for System and Method for Monitoring an Industrial Vehicle filed Dec. 31, 2014 (Smith).
U.S. Appl. No. 62/101,156 for Multiple Primary Use Interfaces filed Jan. 8, 2015 (Pike et al.).
U.S. Appl. No. 62/101,170 for Stack Handling Using Multiple Primary User Interfaces filed Jan. 8, 2015 (Pike et al.).
U.S. Appl. No. 62/101,178 for Portable Dialogue Engine filed Jan. 8, 2015 (Pike et al.).
U.S. Appl. No. 62/101,203 for Application Development Using Multiple Primary User Interfaces filed Jan. 8, 2015 (Zabel et al.).
U.S. Appl. No. 62/101,216 for Voice Mode Asset Retrieva filed Jan. 8, 2015 (Zabel et al.).
U.S. Appl. No. 62/101,221 for Facilitating Workflow Application Development filed Jan. 8, 2015 (Doubleday et al.).
U.S. Appl. No. 62/101,227 for Charger With Storage Element filed Jan. 8, 2015 (Miraglia et al.).
U.S. Appl. No. 62/101,235 for Charge Limit Selection for Variable Power Supply Configuration filed Jan. 8, 2015 (Haggerty et al.).
U.S. Appl. No. 62/101,242 for Power Source Pack De I Ection filed Jan. 8, 2015 (Allen et al.).

\* cited by examiner

DEVICES, SYSTEMS, AND METHODS FOR OPTICAL VALIDATION

CROSS-REFERENCE TO PRIORITY APPLICATION

1. Priority Claim

This application is a continuation application of and claiming the benefit of priority to U.S. application Ser. No. 15/388,082 entitled "DEVICES, SYSTEMS, AND METHODS FOR OPTICAL VALIDATION" filed on Dec. 22, 2016, which is a non-provisional application claiming the benefit of priority to Provisional Application No. 62/273,493, filed on Dec. 312015, the entireties of which are incorporated by reference herein.

FIELD OF THE INVENTION

The present invention relates to optical validation and more specifically, to a validation device that may be used alone or integrated with a system for validating documents, merchandise, or currency. The present invention also relates to methods for optical validation using the validation device and to methods for improving the quality and consistency of data captured by the validation device.

BACKGROUND

Counterfeiting documents, merchandise, and currency is a growing problem, and validating these items (especially currency) is important. While currency validation (CVAL) systems exist, these systems are too slow, costly, intrusive, and/or bulky to be routinely used at common transaction locations (e.g., store checkouts, ATM machines, banks, etc.). Therefore, a need exists for a low-cost CVAL device that may function alone (e.g., handheld, kiosk, etc.) or as part of a larger system (e.g., point of sale system), and which may be operated to validate items (especially currency) in an easy (e.g., handheld) and unobtrusive (e.g., inconspicuous) way.

SUMMARY

Accordingly, in one aspect, the present invention embraces a currency validation (CVAL) device. The CVAL device includes an imaging subsystem, which includes a high-resolution image sensor and optics for capturing digital images of items in a field of view. The CVAL device also includes an illumination subsystem that has one or more illumination sources and optics for illuminating items in the field of view. The CVAL device also includes a processor (also referred to herein as "processing circuitry") that is configured by software to synchronize and control the imaging and illumination subsystems. The subsystems are communicatively coupled so as to exchanges signals and information.

When the CVAL device is triggered (e.g., by the movement of a switch, spoken command, signal from a point of sale system, etc.) to perform a validation process, the processor activates the illumination sources, individually or in combination (i.e., multiplexed), to sequentially illuminate the item in the field of view with light having various (e.g., different) spectral profiles, wherein the wavelengths in a spectral profile may include visible (e.g., red, blue, green, etc.) and/or invisible (e.g., near infrared, near ultraviolet) light. For each illumination, the CVAL system captures an image (or images) of the item using the image sensor. The processor is also configured to process the image or images (e.g., crop, align, resize, segment the item, recognize the item, etc.) to put them in a condition for analysis. The processor is also configured to control (e.g., activate, deactivate, switch, etc.) and synchronize the illumination and image capturing processes. In a possible embodiment, the processor is further configured to analyze the captured images and, based on the analysis, validate currency item or invalidate the currency item (e.g., detect a counterfeit). In some possible embodiments, however, the validation may be performed by a computing device (e.g., as part of a point of sale system) communicatively coupled to the CVAL device.

The validation device may be used alone or as part of a larger system (e.g., a point of sale system, a kiosk, etc.), and in various embodiments, may perform several functions. For example, a dual-purpose, handheld imager may be incorporated with a point of sale system to perform both checkout operations and currency validation. In a first mode (i.e., indicia-reading mode), the handheld imager operates as a typical imaging barcode scanner. In a second mode (i.e., CVAL mode), the handheld imager operates as a currency validator. Changing between the first and second modes of operation may be accomplished either automatically (e.g., set by the point of sale system in response to a transaction, set in response to a scanned barcode, etc.) or manually (e.g., set by an operator).

Capturing multiple images of an item (e.g., banknote) illuminated with various spectral profiles is an important aspect of the optical validation embraced by the present invention. As a result, various embodiments for the providing and controlling the illumination are envisioned.

In various embodiments, the illumination subsystem may include multiple light emitting diode (LED) arrays, each configured to radiate light in a particular spectral band (i.e., each having a particular spectral profile). Each LED array may be controlled by the processor to illuminate the field of view with a particular intensity and/or duration. Likewise, multiple LED arrays may be simultaneously activated to illuminate the field of view with a spectral bandwidth that is the combination of each individual LED array. In some possible embodiments, the light from the LED is sensed (i.e., sampled). The sensing provides feedback, that when interpreted by the processor may be used to control the illumination exposure. This feedback control may be necessary to compensate for device temperature (e.g., LED temperature) or to minimize device variations (i.e., calibration).

In various embodiments, the spectral profiles may be controlled via optical filters placed between the light sources and the item (i.e., in the transmit path) or placed between the item and the image sensor (i.e., in the receive path). To produce images of the item under various spectral conditions, different filters (or combination of filters) may be mechanically moved in/out of the transmit/receive paths. The filters may be absorptive type filters (e.g., colored glass) or interference type filters (e.g., layers of thin films on a substrate) and may be mechanically mounted on a filter wheel that can be rotated to adjust the position of the filters.

The validation device may also include means for providing feedback to a user. This feedback may (i) help a user position the item/validation-device and/or (ii) may provide the results of the validation to a user.

In various embodiments, the validation device may include an aiming subsystem to project a pattern into the handheld imager's field of view that helps a user position the item and/or the validation device (i.e., for handheld embodiments). As a result, the aiming subsystem typically includes a visible light source (e.g., laser, LED, etc.), an imageforming element (e.g., an aperture, a diffractive optical element, etc.), and a projection lens (or lenses). Further, the aiming subsystem may project two distinctly different (e.g., different in size, shape, color, flashing, etc.) targeting patterns, wherein each targeting pattern corresponds to one of the two modes of operation (e.g., indicia reading, CVAL, etc.).

In various embodiments, the validation device may include at least one positioning indicator to help a user position the currency item and/or the validation device (i.e., handheld imager) for validation. Here, the processor may generate real-time indicator signals that activate the (at least one) indicator to guide the repositioning of handheld imager and/or currency item toward an optimal position for validation. The indicator signals may also indicate that an optimal position has been achieved. The indicator signals may also indicate that a portion of the currency item is obscured. The (at least one) indicator may transmit audio, visual, or haptic (e.g., vibration) signals to a user. In various embodiments, the indicator signals may be sent to the aiming subsystem to cause a change (e.g., flashing, color change, etc.) in the targeting pattern based on the determination.

The validation device may provide (to a user) the results of the validation process via interface circuitry 57 and indicators/display, either integrated with the validation device or communicatively coupled to the validation device. The indicators may provide visual, audible, and/or tactile messages to a user based on the validation results. These messages may also include instructions for the user regarding the next steps that should be taken in the validation process.

The validation device may be powered by a battery or via a cable connected to a power supply (e.g., a USB power supply). For cases in which the power supplied by the power supply is insufficient, an additional storage element (e.g., a battery, super capacitor, etc.) may be used to provide additional power. In these cases, the storage element may be integrated with the cable.

High quality images of the item (e.g., currency item) improve the validation process. To this end, various components or systems may be integrated with the CVAL device to improve image quality.

In various embodiments, the validation device includes a set of crossed polarizers to remove specular reflections from the item. Here, a first polarizer may be positioned in front of the illumination subsystem's light sources and a second polarizer may be positioned in front of the imaging subsystem's image sensor.

In various embodiments, a banknote (i.e., bill, currency, etc.) holder may be used with the validation device to facilitate the imaging of the currency item. The banknote holder typically has a substrate with a reflective surface (e.g., metallic mirror, dichroic mirror, etc.) onto which a banknote may be placed for verification. When placed on the banknote holder and illuminated by the validation device, a portion of the light from the validation device passes through the banknote and is reflected back through the banknote to the image sensor of the validation device. In this way, features such as watermarks may be imaged. In various embodiments, the banknote holder may itself include one or more illumination sources/illumination devices.

In another aspect, the present invention embraces methods (i.e., processes) for currency validation. In various embodiments, a validation device is provided (e.g., a handheld CVAL device, a fixedly mounted CVAL device, a CVAL device integrated with a point of sale system, etc.). The validation device is capable of illuminating a field of view with light having different spectral profiles, while synchronously capturing at least one digital image of the field of view for each illumination. A currency item is positioned within the imaging device's field of view and the device is triggered to begin operation. The currency item is then illuminated and imaged in accordance with the previously mentioned capabilities of the validation device to obtain a plurality of digital images of the currency item in different spectral conditions. Then, the digital images are processed and the currency item is validated based on the results of the processing. The validation may include determining if an item is authentic or counterfeit. In various embodiments, validation may include determining if a currency item is fit for use.

In various embodiments, the processing includes recognizing characters or features on the currency item, and then comparing these recognized features to one or more comparison standards retrieved from a computer readable memory (e.g., on the device, on a network, etc.). In some possible embodiments, the recognized characters and/or features may be used to identify the banknote (e.g., to help retrieve a comparison standard) or may be stored to memory as part of a record of the validation. In some cases, these records may be turned over to agencies (e.g., law enforcement, manufacturers, store security, etc.) to help a counterfeit investigation.

In various embodiments, the validation process includes identifying one or more regions of interest on the currency item within each digital image. Then, (i) comparing the pixel levels from the one or more regions of interest to one or more comparison standards, (ii) comparing the pixel levels from a particular region of interest within an image to another region of interest within the same image, or (iii) comparing the pixel levels from a particular region of interest within a first image to another region of interest within one or more other images.

Various forms of reporting the results of the verification are embraced by the present invention, and in some cases, the results of the validation may trigger additional process steps. For example, the results of the validation may cause audible, tactile, or visual feedback to indicate if a currency item is valid or counterfeit. In another example, the results of the validation may cause a digital image of the customer to be captured by a camera (e.g., a security camera) at a point of sale.

In various embodiments, the validation process may include steps for providing feedback (e.g., audible, visual, or tactile) to help align the currency item and/or the CVAL device and/or to determine if the currency item is obscured in the digital images.

In various embodiments, the validation device may operate in two modes (e.g., indicia reading mode, CVAL mode). In this case, the validation process may include steps for adjusting the mode of operation based on an analysis of the captured digital image or images.

In various embodiments, the present invention embraces methods for improving the quality of the data (e.g., digital images) acquired for validation. In various embodiments, the validation method (i.e., validation process) may include steps to sense the authenticity of an item (e.g., merchandise, currency, etc.) by applying a chemical substance to the item before illuminating and imaging the item with different spectral profiles. In various embodiments, image-processing steps may be applied to remove artifacts from the captured digital images.

In various embodiments, the present invention embraces methods for improving the repeatability of validation. In various embodiments, the validation process includes steps to calibrate the validation device. In various embodiments, the validation process may include steps for capturing and analyzing a calibration target to determine the optimal illumination and/or image sensor settings. In various embodiments, the validation process may include steps for capturing a portion of the light from the illumination subsystem and then adjusting the exposure/illumination of the sensor/light-sources to match a calibrated value. In some cases, the calibrated value may be based on a known temperature response of the light sources.

The foregoing illustrative summary, as well as other exemplary objectives and/or advantages of the invention, and the manner in which the same are accomplished, are further explained within the following detailed description and its accompanying drawings.

DETAILED DESCRIPTION

Section I: Validation Device 10

At point of sale (POS), multiple devices are often needed to scan barcodes and to determine the authenticity of items at checkout (e.g., currency, merchandise, stamps/labels, driver licenses, etc.). Using multiple devices can slow-down checkout and is not cost/space efficient.

Figure 1:
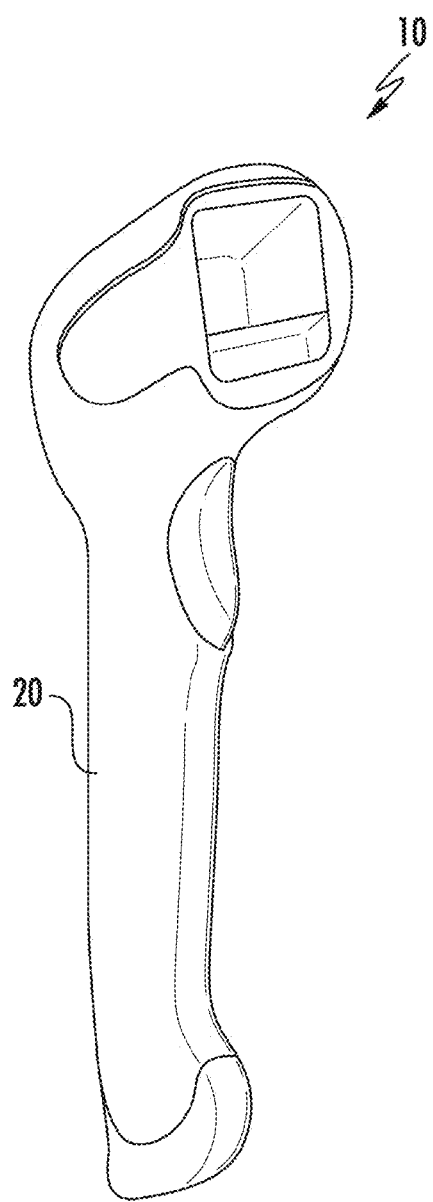
FIG. 1 graphically depicts an exemplary validation device (a handheld imager in the depicted embodiment) according to various embodiments of the present invention.

Referring now to FIGS. 1 through 5, according to various embodiments, a multifunction validation device (e.g., a CVAL device 10) may improve workflow by combining currency verification (CVAL) and indicia reading (e.g., barcode scanning) into a single, hand-held device 10 (such as hand-held imager depicted in FIG. 1). In operation, the validation device's imaging subsystem 12 is used in combination with the illumination subsystem's 14 multiplexed light sources 16 (e.g., see FIGS. 2, 3 and 5) to sequentially capture the reflected and/or luminescent images of value documents (i.e., including but not limited to banknotes 18 and identification labels). The imaging subsystem 12 and illumination subsystem 14 are contained within the hand-held validation device's housing 20. The validation device 10 embraced by the present invention embraces some or all of the following features: (i) positioning indication/guidance for operator use; (ii) an indication of evaluation result (e.g., via LED, display 22 (FIG. 2), etc.); (iii) an auxiliary illumination source in which the object (note under evaluation) obscures the view of the camera system so that transmission measurement can be made; and (iv) an energy storage/charging scheme. The device's imaging subsystem 12 and illumination subsystem 14 (FIG. 2) are typically optimized to a particular distance at which the object is evaluated. The validation device 10 allows a user to image items in a variety of positions and orientations.

In order for paper currency to continue to be widely accept for commercial transactions, there needs to be high confidence that the bills being presented at the point-of-sale (and elsewhere) are genuine (and are not counterfeit or forged). An image-based currency evaluation system can provide a higher degree of confidence in a bill's authenticity. Often, such an imaging-based system uses various colored light sources 16 (or light sources 16 with different spectral profiles) in order to detect wavelength dependent variations in the reflectance from the bills (i.e., banknotes) to determine authenticity.

Filters 24 (FIG. 2) may be used to create light having different spectral profiles when combined with a broadband (e.g., white light) light source (or light-source combination). The filtering results from the filter's particular transmission, absorption, or reflectance characteristics.

A validation device 10 may use filters 24 of different construction and/or composition. For example, colored plastic (or glass) may be used or multilayer interface filters may be used. Colored plastic (or glass) filters are relatively insensitive to angular orientation, whereas interface filters may be highly sensitive to angular orientation.

Figure 6:
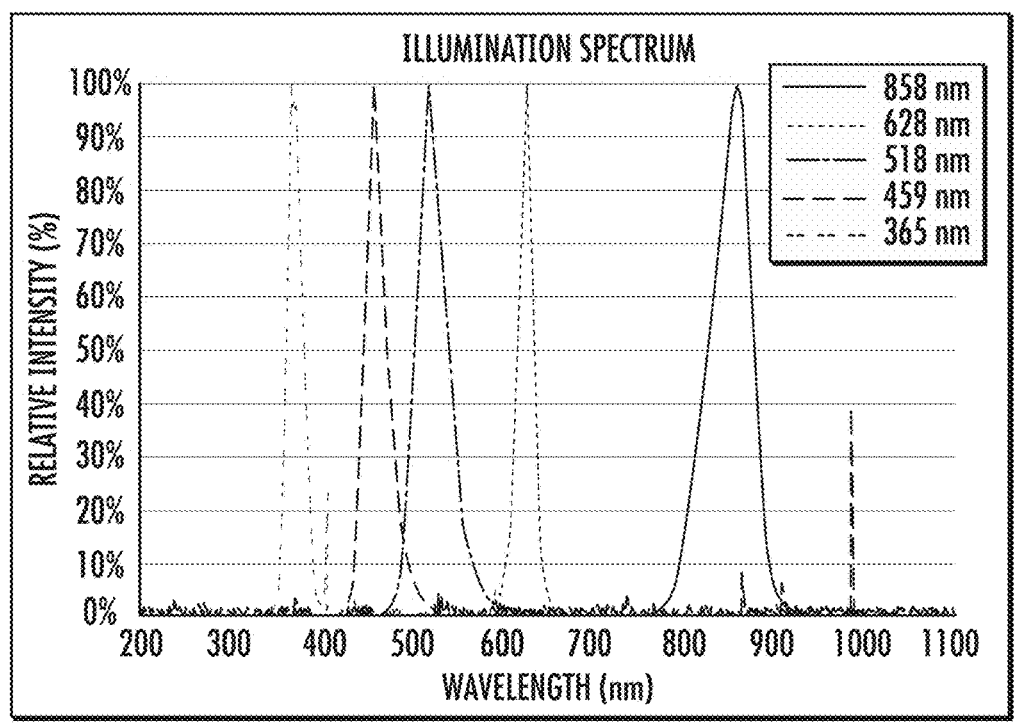
FIG. 6 graphically illustrates the spectral profiles of the various light sources used for validation according to various embodiments of the present invention.
Figure 7:
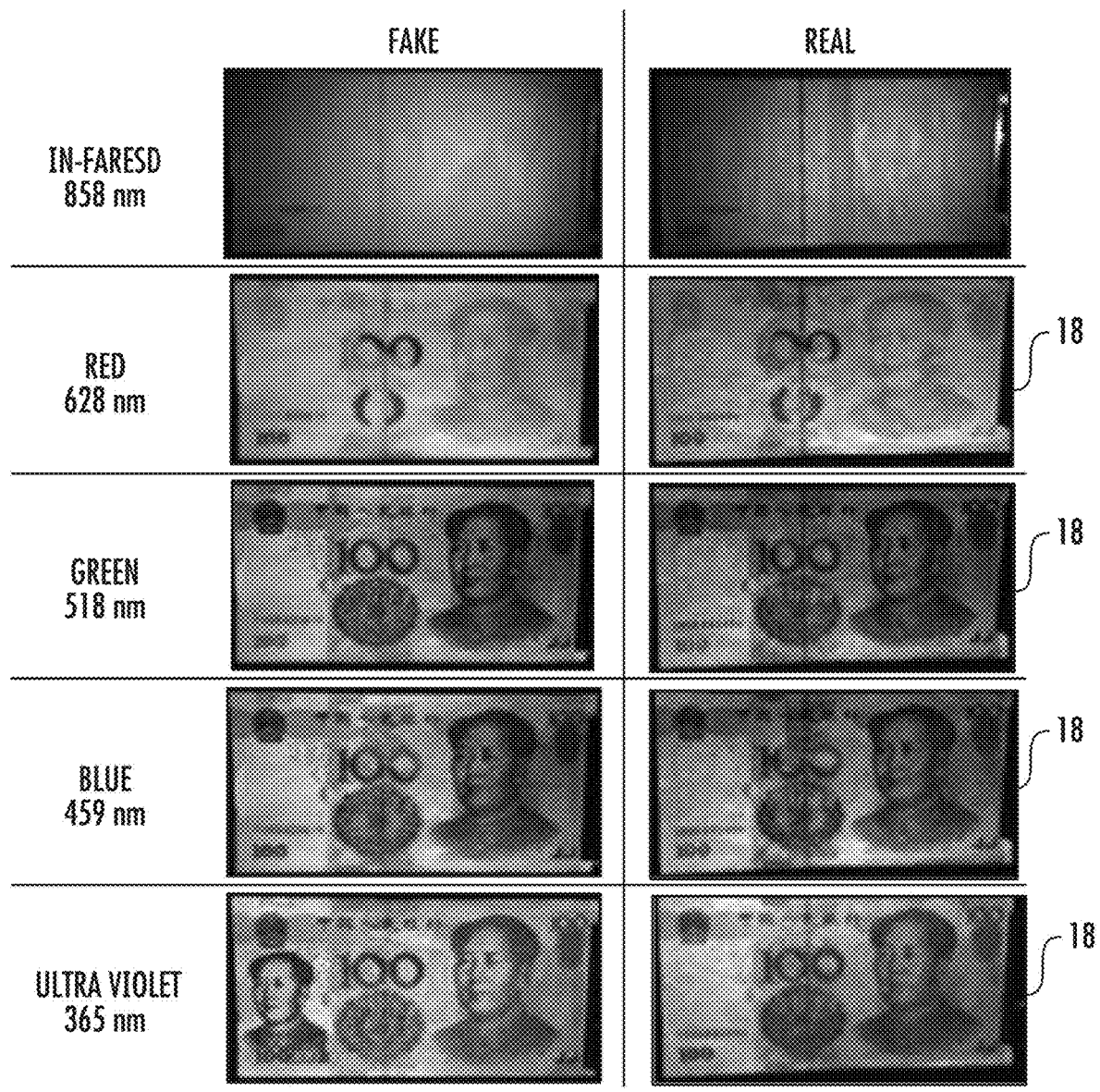
FIG. 7 graphically illustrates images acquired for a real banknote and a counterfeit banknote, wherein each image was acquired using a different illumination spectral profile, according to various embodiments of the present invention.

Control of the illumination's spectral profile (e.g., color) may be accomplished by controlling the filters 24 and/or the light sources 16 in the validation device 10. In various embodiments, a filter (or filters) 24 may be positioned in front of a light source 16 and mechanically moved in and out of position to change the spectral profile of the illumination. In various embodiments, a multilayer filter may be positioned in front of a light source 16 and mechanically rotated to change the spectral profile of the illumination. This filter-tuning approach is especially useful if very narrow changes in peak emission wavelengths are needed for validation. In various embodiments, diffractive optical elements (e.g., gratings) may be used to produce illumination having different spectral profiles. In various embodiments, multiple light sources 16 (e.g., FIGS. 3 and 5) can be used to produce illumination of various spectral profiles, such as shown in FIG. 6. These multiple light sources may be individually controlled (i.e., turned on and off in various combinations) to produce different illumination spectral profiles.

As noted previously, in order for paper currency to continue to be widely accepted for commercial transactions, there needs to be a high degree of confidence that the bills presented at the point-of-sale (and elsewhere) are genuine (i.e., not counterfeit or forgeries). Using an image-based currency evaluation device (i.e., validation device 10) provides a higher confidence of a bill's authenticity. The validation device 10 embraced by the present invention captures a plurality of images of an item, wherein each image of the item represents the item's spectral response (e.g., reflectivity, fluorescence, etc.) to a particular wavelength and/or spectral profile (i.e., collection of wavelengths). In some cases, discriminating features used for validation may appear in images of the item for a particular spectral profile, while not appearing or in other spectral-profile images. A valid banknote and counterfeit banknote illuminated and imaged using various spectral profiles are shown in FIG. 6.

In various embodiments of the validation device 10 embraced by the present invention, the various images are obtained using optical filters 26 positioned in front of the imaging subsystem's image sensor 28 (i.e., in the return path). A benefit to using filters in this way is that the spectral profile of the light reaching the image sensor 28 is controlled, even if ambient light levels vary (e.g., vary in intensity, color, etc.).

The filters 28 used in the return path (i.e., receive path) of imaging subsystem 12 may be of various constructions and/or compositions. For example, colored (dies) plastic, colored glass, or interface (i.e., multilayer, dichroic, etc.) filters may be used. Colored plastics and glass filters are relatively insensitive to angular orientation, whereas interface filters may be highly sensitive to angular orientation.

In various embodiments, multiple filters 28 may be placed in the return path and may be mechanically moved in and out of position to change the spectral profile of the light reaching the image sensor 28. In various embodiments, the angular orientation of an interference filter in front of the image sensor 28 may be changed to tune the spectral profile precisely. Similarly, diffractive optical elements (e.g., gratings) may be used to filter the light reaching the image sensor.

Increasing evidence of counterfeiting indicates that currency validation/authentication is a growing need in many parts of the world. Multispectral illumination and imaging for validation is embraced by the present invention to address this problem. The images acquired by a verification (i.e., validation) device 10 may contain artifacts (e.g. shadows, glare, fibers, dirt, etc.). These artifacts do not contain valuable information and introduce spatial noise, thereby making validation difficult. The present invention embraces mitigating this spatial noise to improve the quality of the images provided for validation.

Surfaces typically reflect light in two ways: specular and diffuse. Diffuse reflections from a currency item (e.g., banknotes 18) are generally weaker than specular reflections from the currency item but contain the information necessary for validation. Specular reflections contain no valuable information about a printed surface, and as a result, minimizing their intensity is helpful for validation. The present invention embraces minimizing specular reflections from a currency item by controlling polarization of the illumination light and the light detected by the image sensor 28. Specifically, the illumination light may be polarized in a particular direction and the light captured by the image sensor is polarized in a direction orthogonal to the particular direction (if polarizers 30 and 32 are used). In this way, the light reflected from the currency item is filtered (i.e., by its polarization) to remove the polarization of the illuminating light. As diffuse reflected light is largely unpolarized, a portion of the diffuse reflected light will reach the image sensor 28. As the specular reflected light is largely polarized in the direction of the illumination, the specular reflected light will be substantially blocked. In various embodiments, a linear polarizer is positioned in front of the illumination subsystem and a crossed polarizer is positioned in front of the image sensor. In this way, very little light from the illuminator or from specular reflection is detected by the image sensor.

Figure 2:
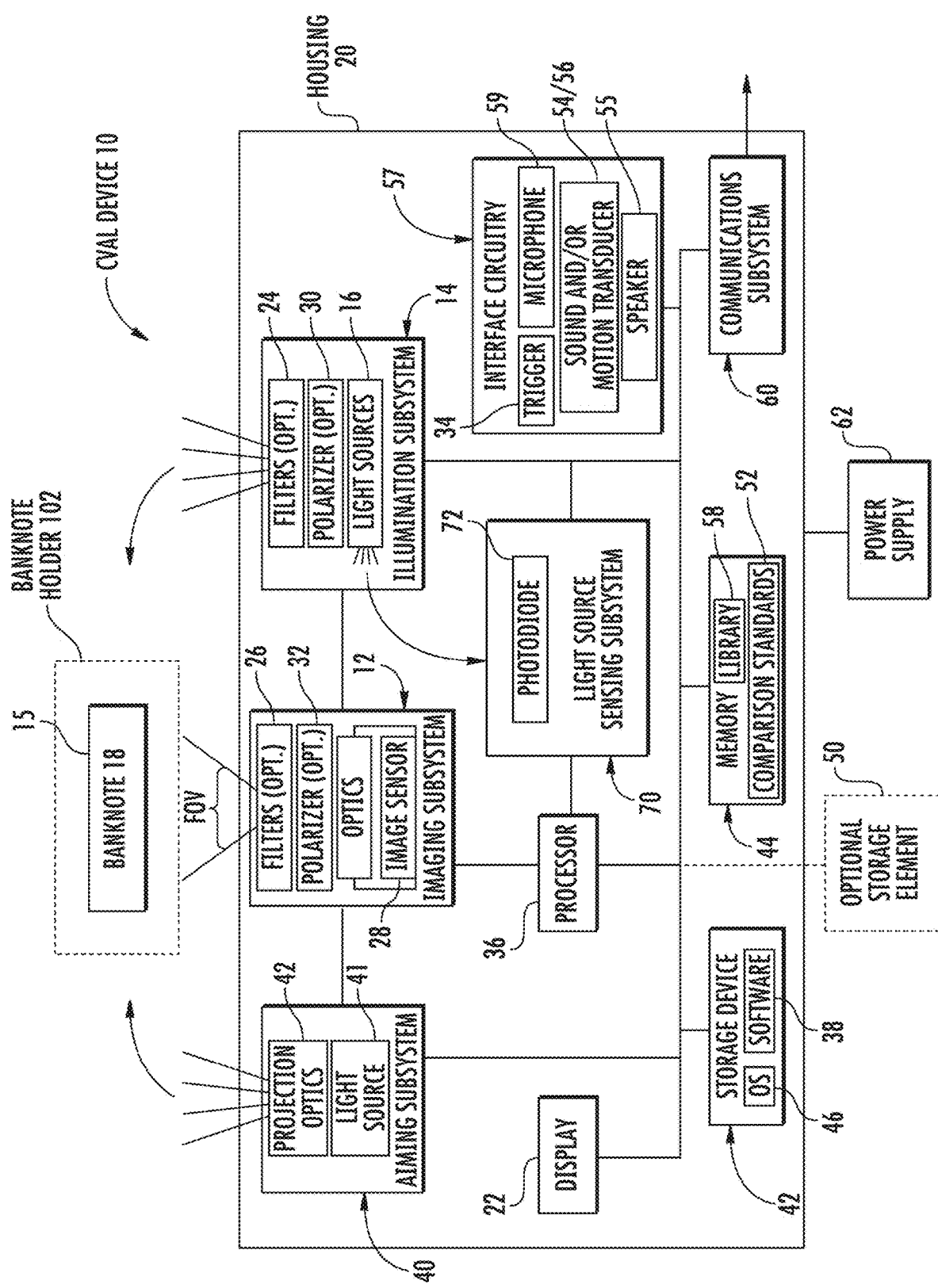
FIG. 2 is a schematic block diagram of the components of the exemplary validation device shown in FIG. 1, according to various embodiments of the present invention.
Figure 3:
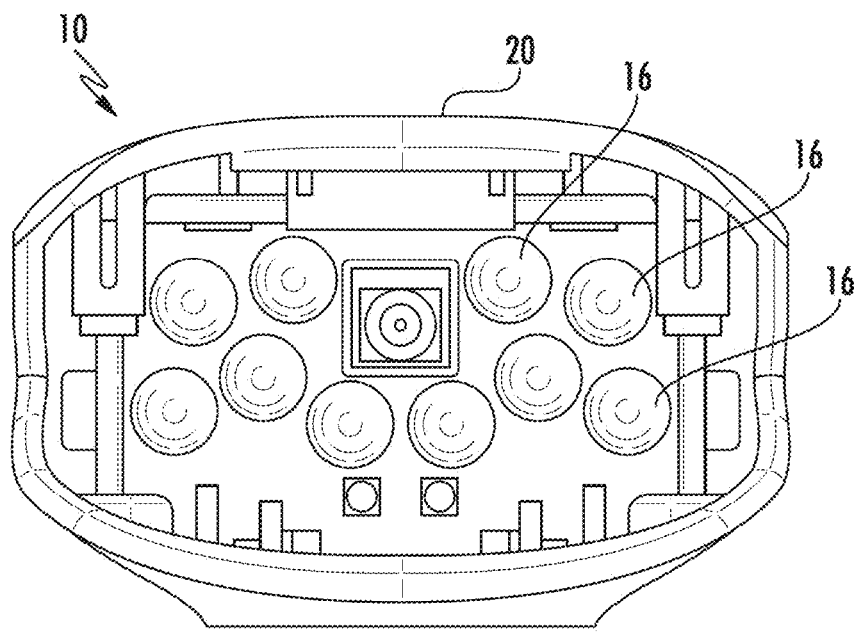
FIGS. 3 and 4 graphically depict two cross sections of the exemplary validation device shown in FIG. 1, according to various embodiments of the present invention.
Figure 4:
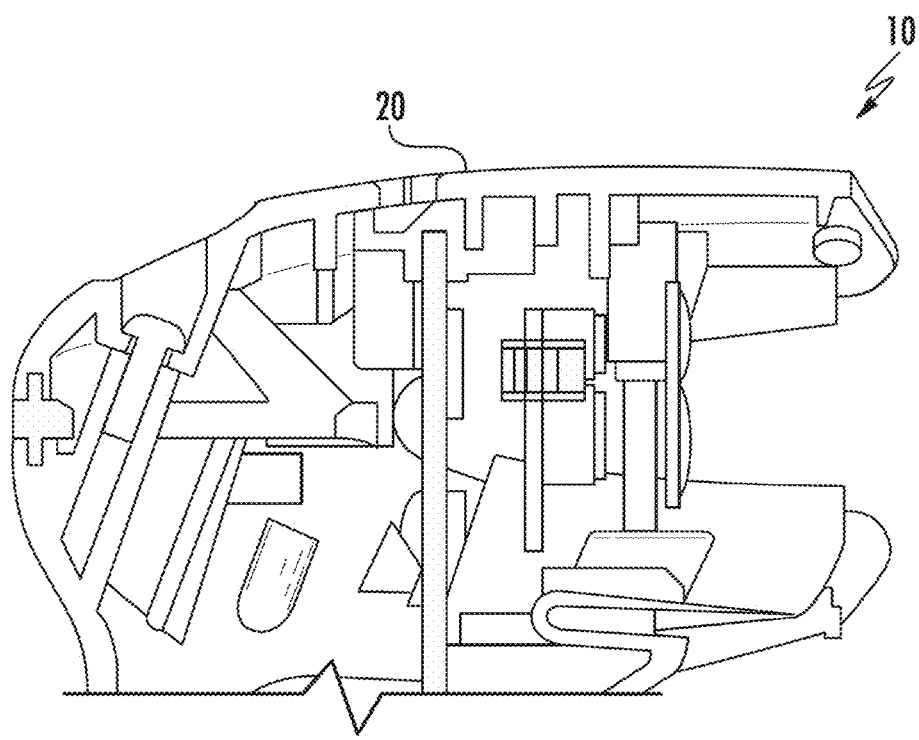
Figure 5:
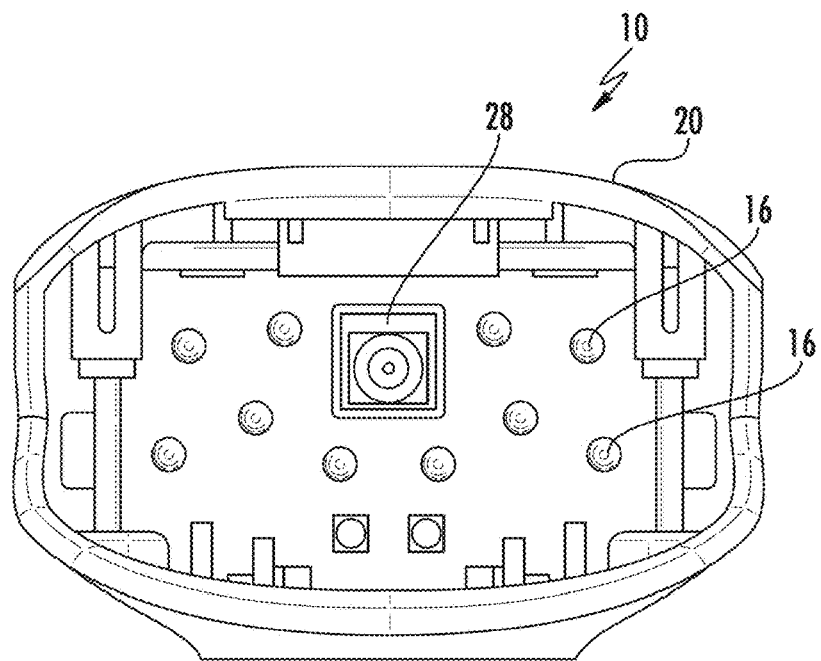
FIG. 5 graphically depicts a cross section of the exemplary validation device of FIG. 1, illustrating exemplary locations of the various light sources and the image sensor according to various embodiments of the present invention.

The validation device 10 further comprises a processor (also referred to herein as processing circuitry) communicatively coupled to the imaging subsystem 12 and the illumination subsystem 14. The processor 36 is configured by software 38 (stored, for example, in a storage device 42 or memory 44 of the validation device 10) to activate one or more of the light sources 16 in the illumination subsystem 14 to illuminate a currency item, capture an image of illuminated currency item, and repeat activating one or more light sources and capturing digital images until a plurality of digital images of the currency item have been captured, and process the plurality of images to validate the currency item. The storage device 42 of FIG. 2 is also depicted as including an operating system 46.

Barcode scanners are ubiquitous at retail checkouts, and the ability to detect counterfeit currency is a growing need. The present invention embraces combining these functions into a single validation device 10, in which the mode of operation is indicated to avoid confusion.

In various embodiments, the validation device 10 includes an aiming subsystem 40 capable of projecting two different targeting patterns, one for each of the two modes of operation. In a first mode, one light pattern will be projected into the field of view of the device. If the mode of operation is changed, a different pattern will be projected. The targeting pattern will alert the operator of the mode and/or the mode change. The aiming subsystem 40 may be communicatively coupled to the mode-selection switch and has one or more aiming-light sources 41 and optics 42 for projecting (i) a first targeting pattern into the field of view when the CVAL device is in indicia reading mode and (ii) a second targeting pattern into the field of view when the CVAL device is in CVAL mode. The aiming system's one or more aiming-light sources 41 may include a first laser for radiating light for the first targeting pattern and a second laser for radiating light for the second targeting pattern.

The aiming subsystem 40 may project the targeting pattern into the field of view using a variety of technologies (e.g., aperture, diffractive optical element (DOE), shaping optics, etc. (referred to collectively as projection optics 42 (FIG. 2)). A combination of technologies may also be used to create the two targeting patterns. In one embodiment, two diffractive rectangular patterns may be used. For barcodes, a pattern with a square aspect ratio could be projected, while for currency a pattern with an aspect ratio that matches the banknote may be projected (e.g., 2×1 aspect ratio). In various embodiments, a red line pattern may be projected for barcodes, while a green line pattern may be projected for currency. In various embodiments, a red rectangular area for barcodes may be projected from an LED, while a green crosshair is projected for currency from a DOE. The present invention envisions any combination of technology and patterns that produce easily visualized modes of operation.

The validation device 10 envisioned by the present invention requires significant energy to provide the high-intensity illumination and fast image-capture necessary for operation. As a result, the current consumption required by the validation device may exceed the current limits (e.g., 500 milliamps) of a typical power source 62 (e.g., USB). For example, current consumption of the illumination subsystem may exceed the power limits of a USB connector if multiple illuminations/image-captures are required.

The validation device 10 may store energy in a storage element during periods rest (i.e., nonoperation) and then use the stored energy for illumination, when high current is required. In various embodiments, the storage element is at least one super-capacitor capable of supplying the illumination subsystem energy without depleting the energy necessary for other operations (e.g., scanning). A typical super-capacitor has enough energy capacity for a sequence of illuminations (i.e., "flashes") before charging is required. In various embodiments, the storage element may be a rechargeable battery. The battery may be charged when validation is not required and then may be used to provide energy for the sequences of "flashes" during validation.

The present invention also embraces integrating the storage element (or elements) 50 outside the housing 20 of the validation device 10. For example, the storage element 50 may be incorporated inside the validation device's power/data cable. In this case, efficient charging may be accomplished using a current limiting resistor directly from the power source. The storage element may also be distributed along the cable, using the length of the cable and multiple layers to create a "cable battery" or "cable capacitor".

While various components of an exemplary validation device are depicted in FIG. 1, it is to be understood that there may be a fewer or a greater number of components in the validation device 10 and their location within and/or outside the validation device may vary.

Section II: Validation Systems

Figure 8:
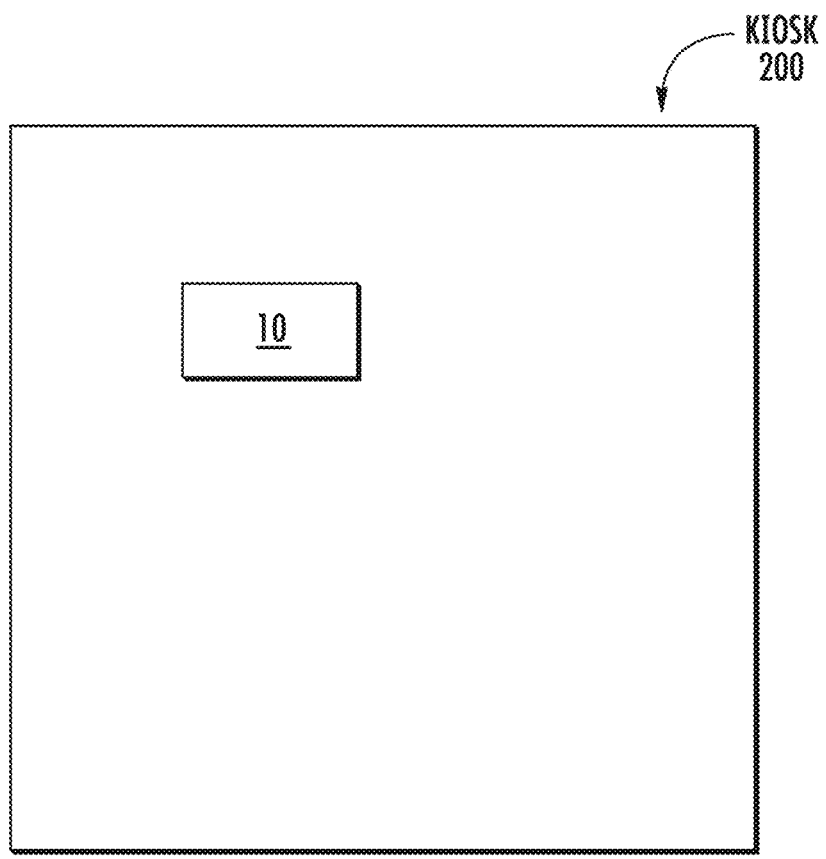
FIG. 8 is a schematic block diagram of a verification kiosk, according to various embodiments of the present invention.

To combat counterfeiting, banknotes need to be recognized, removed from circulation, and in some cases, reported to authorities for data collection and analysis. Detecting counterfeits immediately at transaction locations offers advantages to law enforcement and commerce. The validation device 10 embraced by the present invention may be combined with other systems to create a verification kiosk 200 (FIG. 8) according to various embodiments of the present invention. The verification kiosk 200 (or simply "kiosk") is a convenient way for validating banknotes 18 at useful locations.

In various exemplary implementations, banks may use a kiosk 200 (FIG. 8) to verify the currency items they receive or distribute. In another exemplary implementation, check-cashing centers may provide a kiosk for public use. In another exemplary implementation, a kiosk may be placed near (or integrated with) an automatic teller machine (ATM), and in some cases the ATM/kiosk may be configured to exchange counterfeit banknotes for authentic banknotes. A kiosk 200 may also be configured to collect user information and/or take a photo of the user. In addition, a kiosk may collect and provide additional information such as a time/date, a banknote serial number, or human metrics, such as an iris-scan or thumbprint. In various embodiments, a kiosk 200 may be configured to permit a user to exchange banknotes/paper money with handling damage (e.g., folds or creases, cuts, stains, rounded corners, etc.) for new banknotes (or at least higher graded banknotes/paper money) with authenticity validated during the exchange.

Figure 9:
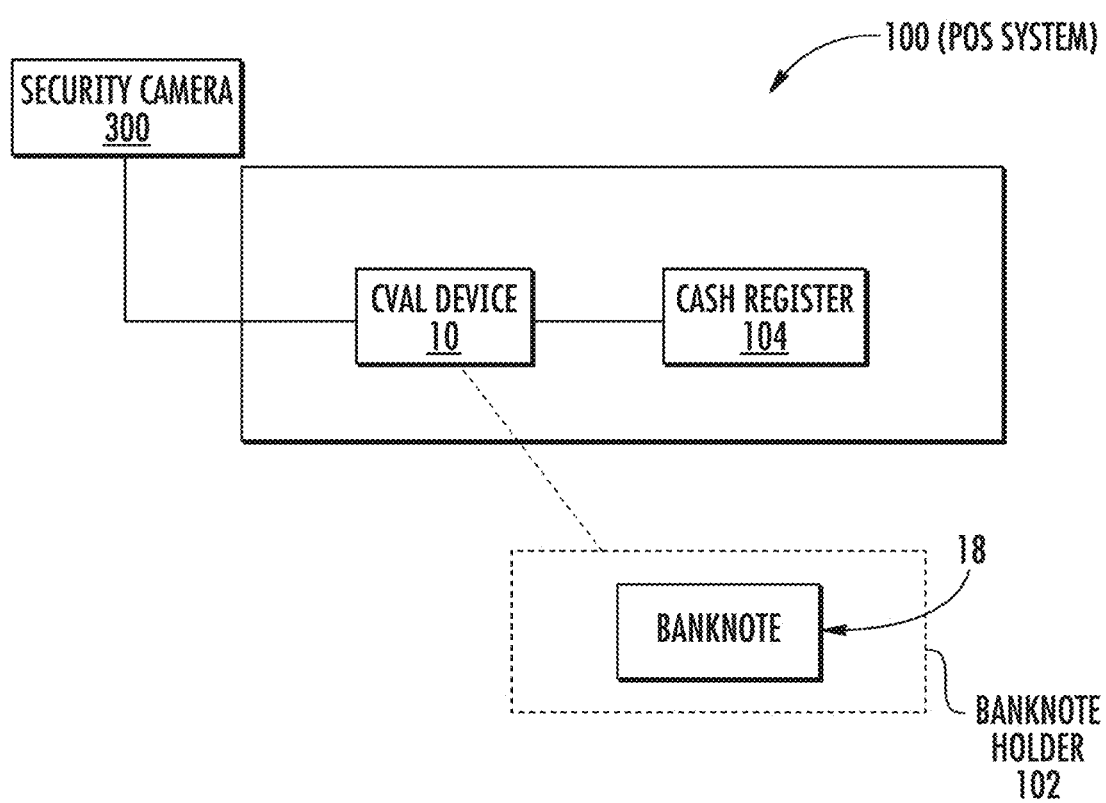
FIG. 9 is a schematic block diagram of a point of sale system including the validation device, according to various embodiments of the present invention.

Still referring to FIGS. 1 and 2 and now to FIG. 9, according to various embodiments, the present invention also embraces a point of sale system 100 with validation capabilities. The point of sale system 100 comprises the validation device 10 communicatively coupled to a cash register 104. The cash register 104 registers and calculates transactions at the point of sale. A point of sale system's validation device 10 (e.g., handheld imager as depicted in FIG. 1) may be configured for multiple functions (e.g., CVAL, barcode scanning, etc.). In this case, the handheld imager must be capable of switching between modes either automatically or manually. Productivity may depend on the ease and speed of this mode switching.

In various embodiments of automatic mode initiation, image capture is initiated resulting in one or more captured images after which the handheld imager's firmware searches the captured digital images for items (e.g., barcodes, characters, features, artwork, banknotes, etc.) and, upon recognition, changes the mode of operation appropriately. If a barcode is detected (i.e., recognized), barcode decoding mode is initiated and the image or images are processed. If currency item (rather than a barcode) is detected (i.e., recognized), more images may be needed to obtain the full multispectral set of images, after which the images are processed for authentication. In various exemplary implementations of automatic mode initiation, a point of sale computer controls the mode of operation based on a point in a transaction process (e.g., barcode scanning is complete, payment is necessary, etc.). Regardless of the payment form, the validation device 10 comprising a dual- or multi-mode CVAL device can be changed to the currency validation mode and used for currency validation. When the POS system 100 indicates that the transaction process is complete, the dual- or multi-mode CVAL device is returned to barcode scanning mode (i.e., indicia reading mode). In various embodiments, the handheld imager (the CVAL device) supports barcode scanning as the primary function, by default. In this case, the handheld imager's decoding process attempts to decode barcodes. If a barcode is detected in a captured image, then the handheld imager does not switch to a new mode. If, however, no barcode is detected, then the handheld imager begins a process to determine if the mode of operation should be changed. As noted previously, such a process could include capturing additional images and/or additional image processing to identify currency features.

The handheld imager's operator may manually initiate the mode of operation (e.g., barcode scanning, CVAL, merchandise validation, etc.). In various embodiments, the operator initiates a mode of operation by activating a dedicated trigger switch 34 (e.g., pressing once, repeatedly, or in a pattern). The trigger switch may be a mechanical, optical, magnetic, or capacitive switch. This trigger may also control various functions within a signal mode. For example, pressing the trigger may initiate an aiming subsystem 40 to project a targeting pattern to guide the placement of a currency item, and releasing the trigger switch may initiate a verification process.

Other means to change modes are envisioned by the present invention. For example, a special barcode or symbol may be scanned, when the device is in barcode scanning mode, to initiate the authentication mode of operation. After validation is complete, the validation device 10 could return to barcode scanning mode after a set period of inactivity (e.g., a few seconds). In another example, a voice command may be used to initiate, change, or terminate the mode of operation, such as through a microphone (e.g., microphone 59 in FIG. 2) in or outside of the validation device 10.

For commercial transactions, confidence in the validity of banknotes is needed. Using a point of sale system 100 configured for validation can provide this confidence by recognizing forgeries through the detection of security features on banknotes (i.e., bills). As many security features are located on the both the front, back, and within the banknote, it is useful to evaluate transmission as well as reflectance characteristics of the bill.

In various embodiments, in the point of sale system 100 embraced by the present invention, a banknote holder 102 (i.e., bill holder) may be used to obtain the optical transmission characteristics of the bill. The banknote holder 102 includes a highly reflective surface. When the back (or front) surface of the banknote 18 is placed on the reflective surface and the front (or back) surface of the banknote is illuminated, the light reflected from the reflective surface reveals the transmission characteristics of the banknote. The reflective surface may be a broadband reflective surface (e.g., metallic mirror) or may be a reflective surface with a particular spectral profile that is customized to reflect only specific wavelengths (e.g., infrared (IR) ultra-violet (UV), and/or portions of the visible spectrum). In various embodiments, the banknote holder 102 may itself include one or more illumination sources/illumination devices.

Section III: Methods for Validation

Figure 10:
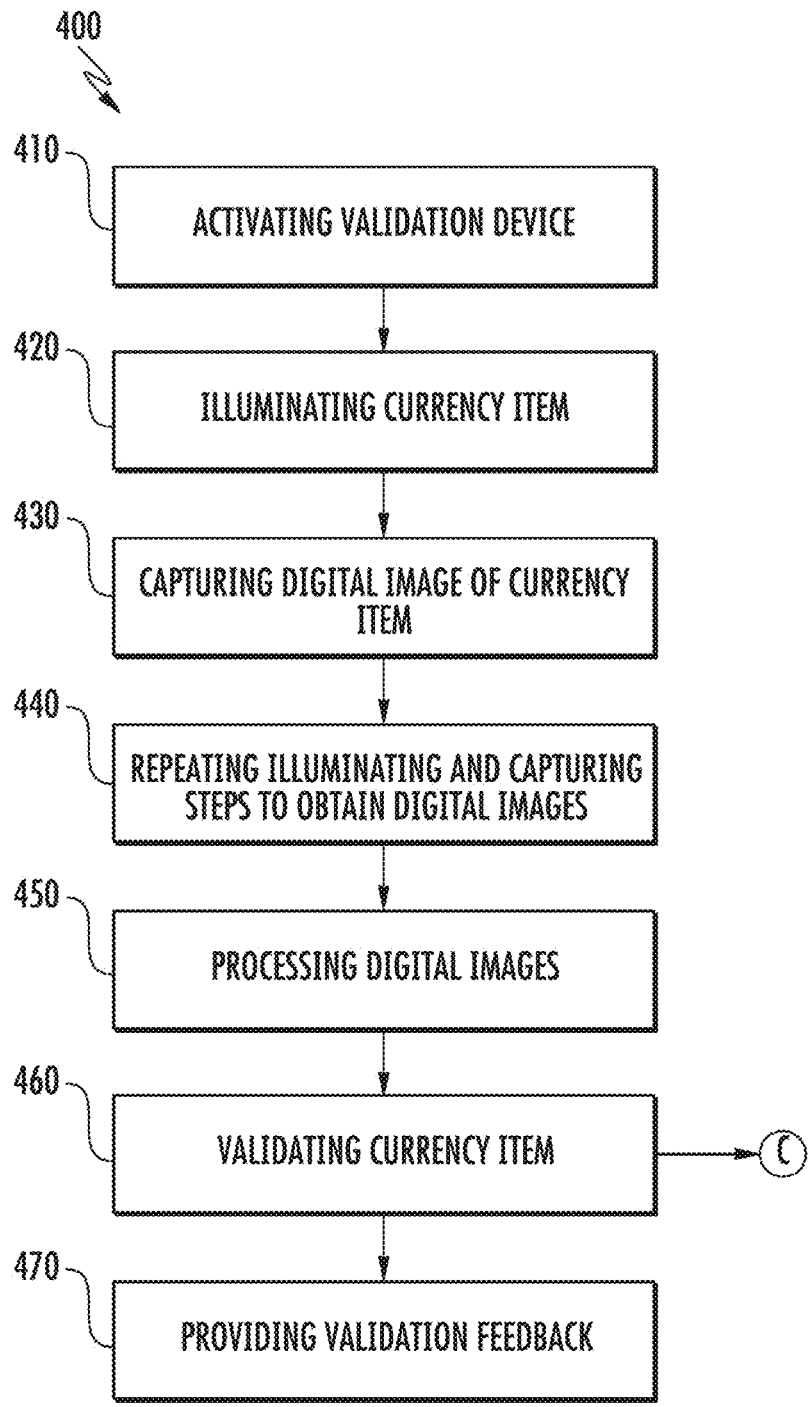
FIG. 10 is a flow diagram of a method for currency validation, according to various embodiments of the present invention.

Still referring to FIG. 2 and now to FIG. 10, according to various embodiments of the present invention, a method 400 for currency validation is provided. The method 400 for currency validation comprises activating the verification device 10 to begin operation (step 410), illuminating the currency item with light having a particular spectral profile (step 420), capturing a digital image of the illuminated currency item (step 430), repeating the steps of illuminating and capturing to obtain a plurality of digital images of the currency item illuminated by different spectral profiles (step 440), processing the digital images (step 450), validating the currency item using the results of the processing (step 460), and providing feedback (step 470) as herein described.

According to various embodiments, methods 500 through 600 and methods 800 through 1200 may be standalone methods as respectively depicted in FIGS. 11, 12, and 14 through 18 or may be used in conjunction with method 400 according to various embodiments as hereinafter described. When used in conjunction with method 400 for currency validation, it is to be understood that certain steps in methods 500 through 600 and methods 800 through 1200 are the same as or similar to the steps of method 400 depicted in FIG. such that these certain steps are not repeated in performing the respective method in conjunction with method 400. For example, activating step 410 of method 400 (FIG. 10) is the same as activation steps 505, 610, 810, 910, 1010, 1110, and 1210. Illumination step 420 of method 400 is the same as or similar to illumination steps 510, 620, 820, 920, 1020, 1220, although the target of the illumination may be different. The same is true generally with respect to capturing step 430, repeating step 440, and processing step 450 of method 400.

Counterfeiting is a major issue and many POS systems are not configured to validate currency items easily. Current validation methods are slow, expensive, intrusive, and bulky. There is a need for validation at the point of sale that mitigates or solves these problems. The present invention embraces a low-cost, handheld validation device 10 that uses multi-spectral imaging and that can validate currency by comparing images (or image portions) of currency items to those of known authenticity as part of validation, according to various embodiments of the present invention.

Regions of interest on a currency item may be identified and compared to comparison standards for each region of interest. Alternatively, ratios between regions of interest may be used as part of validation. Some advantages of multi-spectral imaging for validation include the creation of a large data set for analysis (i.e., gathers more data than existing systems or a human) the identification of features at dimensions beyond what the human eye can verify.

The validation device 10 embraced by the present invention includes a camera system (the imaging subsystem 12) used in combination with multiplexed light sources 16 to sequentially capture the reflected and luminescent images of value documents (i.e., banknotes, identification labels, etc.). After the multispectral digital images are captured (i.e., after step 440), one or more regions of interest are identified in the digital images in steps 450 and/or 460. Gray levels (reflectance/luminescence intensity levels) in the regions of interest are then compared to control regions in the image or to one or more other regions of interest in the image. Next, signal ratios (i.e., values) for one or more regions of interest are computed. The signal ratios for one or more regions of interest are then compared to "gold standard" (i.e., comparison standard 52) signal ratios, stored in a database or lookup table. Validation (step 460) includes determining whether the compared signal ratios for the one or more regions of interest meet a predetermined acceptable value. The validation results are then provided by the validation device 10 (or by a system connected to the validation device 10) to a user, an actuator, a system, and/or a recording device as feedback in step 470.

The validation device 10 embraced by the present invention may also scan other items (e.g., barcodes, serial numbers, etc.). The validation device 10 may include various components (e.g., color filters, cameras, etc.) The stored comparison standards 52 may be updated in various ways (e.g., electronically, via web-link, etc.). In some possible embodiments, the validation device 10 is not handheld, but rather integrated with a supermarket slot scanner or fixedly mounted options on a counter top or as an overhead document imager.

The validation device 10 embraced by the present invention embraces the multispectral imaging of currency items. Multiple light sources 16 and/or filters 24 may be used to provide illumination having various spectral profiles. For each illumination, the imaging subsystem 12 may be controlled (i.e., exposure control) to capture digital images. The present invention embraces different methods for controlling multiple illumination devices (i.e., strings of LEDs, LED arrays, etc.), each having a different spectral profile.

Figure 11:
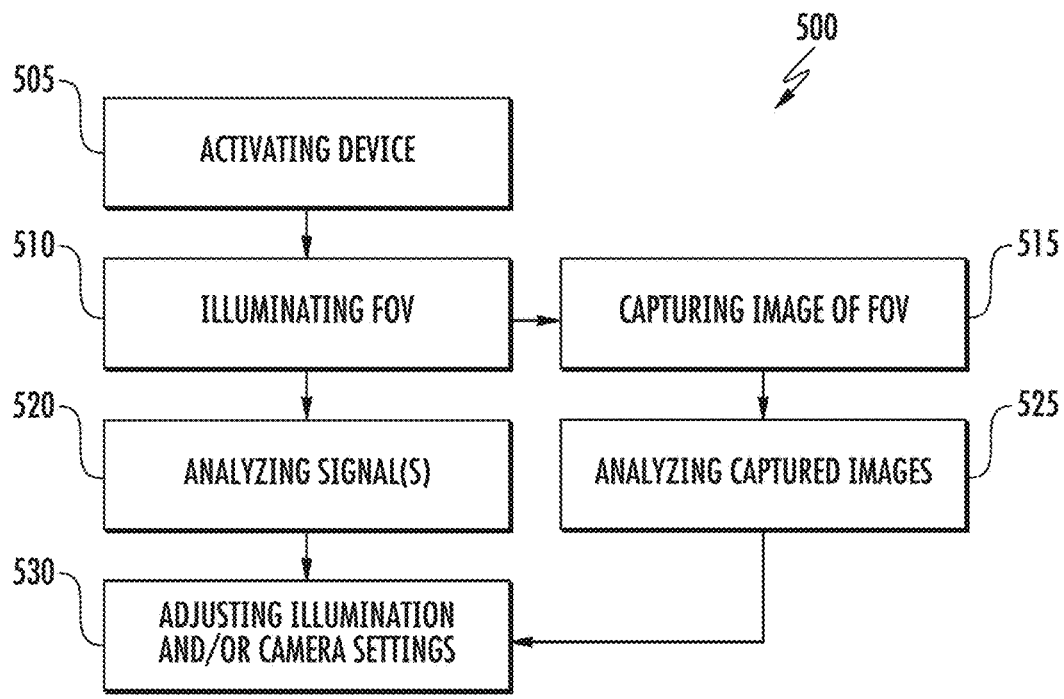
FIG. 11 is a flow diagram of methods for controlling image exposure for currency validation, according to various embodiments.

Referring now to FIG. 11, according to various embodiments of the present invention, a method 500 for controlling image exposure for currency validation is provided. The illumination subsystem of validation device 10 is activated in step 505 and the field of view illuminated (step 510). The field of view may be illuminated with a particular spectral profile, with each spectral profile in a plurality of spectral profiles. A signal from the sensing subsystem 70 (FIG. 2) of validation device 10 may be analyzed in step 520. In step 530, illumination and/or camera settings of the validation device 10 may be adjusted based on the analysis. In various embodiments, digital images of the field of view for each spectral profile may be captured (step 515) and analyzed (step 525) before step 530. In various embodiments, the control methods provide variable sequences, durations, and intensities for multi-wavelength illumination. For example, the illumination may be controlled by adjusting the current for each LED array using DACs, programmable LED drivers (via serial interface), or PWM controls (duty cycle). In another example, the illumination may be controlled by adjusting the illumination time independently for each of the LED arrays. In another example, the illumination may be controlled by activating different LED arrays in a sequence or activating different LED arrays at the same time. In another example, the illumination may be controlled by adjusting the exposure time of the image sensor 28 synchronously with illumination time and dependent on the type or spectral profile of LED arrays.

The control method may also be used to control the illumination for other applications. For example, barcodes of poor quality may be imaged using multiple spectral profiles to improve scanning. In another example, documents, currencies, or products may be verified. In still another example, imaging using multiple spectral profiles could be used for crime scene evidence collection (e.g., UV, IR images).

Referring again to FIG. 10, according to various embodiments, the validation device 10 embraced by the present invention may also provide an indication of validity in step 470. The indication of validity (i.e., the feedback) indicates that the currency item is valid or invalid. In various embodiments, the validation device 10 may include a display 22 to indicate validity. In various embodiments, the validation device 10 includes a sound transducer 54 to produce a sound to indicate validity. In various embodiments, the validation device may include a motion transducer 56 to product a vibration to indicate validity. In various embodiments, the validation device 10 includes a communication subsystem 60 to communicate validity to an external service or person (e.g., a manager, a security person, or a service). Validity may be communicated, stored, shared, automatically without operator involvement.

Figure 15:
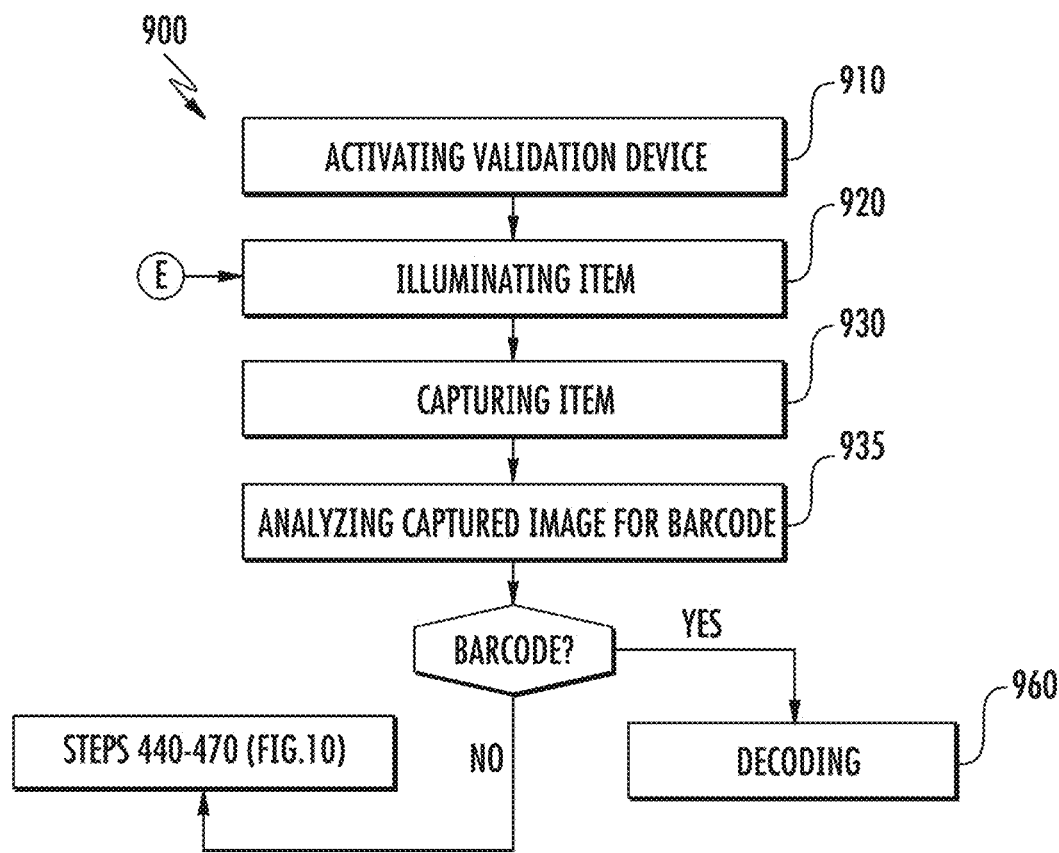
FIG. 15 is a flow diagram of a method for adjusting the mode of operation in a dual-mode validation device, according to various embodiments of the present invention.

As noted previously, the validation device 10 may be capable of operating in either an indicia-reading mode or a CVAL mode. Referring now to FIG. 15, according to various embodiments, a method 900 for adjusting the mode of operation in a dual-mode validation device 10 is provided, according to various embodiments. The user positions an item within the field of view of the validation device 10. The validation device is activated (step 910). An item (an indicia item or a currency item) is illuminated (step 920). A digital image of the illuminated item is captured (step 930). The captured digital image may be analyzed (step 935) for the presence or absence of the indicia item (e.g., a barcode). Based on the analysis of the captured digital image, if the item is a currency item, it is validated or further validated with the validation device 10 operating in CVAL mode with the processor performing steps 440 through 470 of FIG. 10. If the captured digital image includes a barcode, the barcode is processed to be decoded (step 960).

In a possible implementation, activating a trigger 34 (e.g., by pushing a button, touching a specific area on the validation device 10 (i.e., handheld imager)) initiates the validation device 10 to capture images and search for a barcode within the captured images (i.e., the processor activates the validation device (step 410). If there is a one or two-dimensional barcode in the captured images, the validation device 10 will scan the barcode. If there is no barcode present in the capture images, the validation device performs steps 440 through 470 (of FIG. 10). As noted previously, step 440 in the CVAL process (FIG. 10) includes illuminating the banknote with multiple spectral profiles of light sequentially and in rapid succession and capturing digital images for each illumination. The captured images will then be processed (in step 450) to identify the banknote 18 and to compare it to a library 58 of information for that type of banknote. Feedback of the validation results may then be provided to a user, other person, or service in step 470. If a barcode or other indicia item is detected in step 935, the indicia item may be decoded in step 960 as previously noted.

Figure 12:
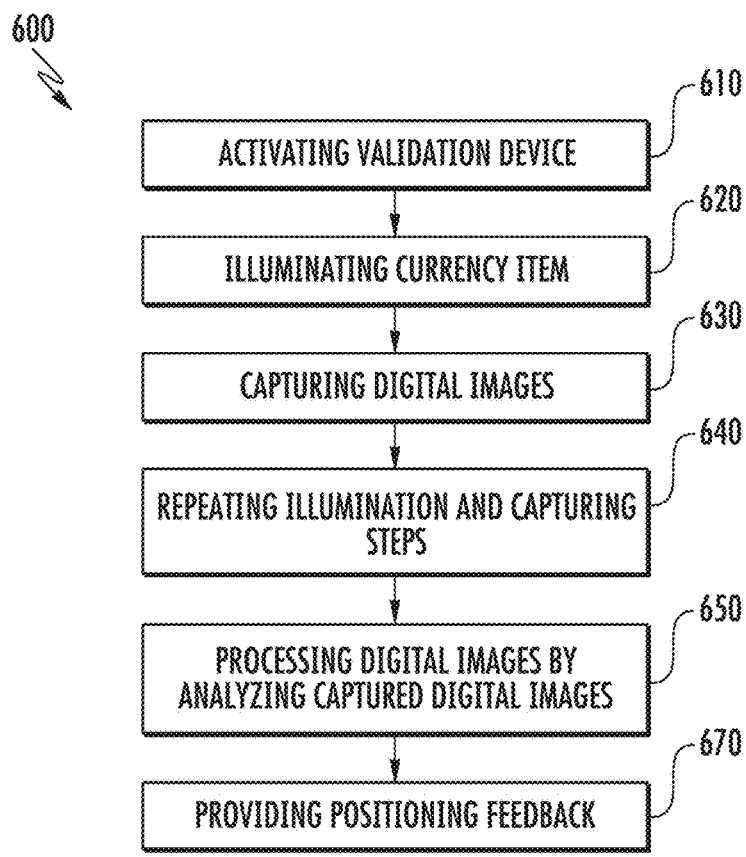
FIG. 12 is a flow diagram of methods for aligning a currency item with a validation device (such as depicted in FIGS. 1 and 2), according to various embodiments.

Referring now to FIG. 12, according to various embodiments, a method 600 for aligning a currency item with a validation device 10 (i.e., CVAL device) is provided. Similar to method 400, method 600 comprises activating the validation device (step 610), illuminating the currency item (step 620), capturing a digital image of the currency item (step 630), and repeating the illuminating and capturing steps to obtain digital images (step 640). The captured digital images from step 640 are processed in step 650 by analyzing the captured digital images of the currency item. The captured digital images may be analyzed to determine the currency item's position relative to an optimal position. The captured digital images may be analyzed to determine if at least a portion of the currency item is obscured. Currency items need to be positioned properly within the validation device's field of view (FoV) (including the depth) for best results. The present invention embraces methods for positioning a currency item with respect to the camera's field of view (FoV) and/or depth of field (DoF) by providing positioning feedback in step 670. The positioning feedback enables a user to understand when a currency item is properly positioned (and when it is not). The positioning feedback may indicate if the currency item needs to be moved in a particular direction, rotated, and/or moved further or closer to the imager to reach an optimal position. The positioning feedback may indicate that the view of the currency item is obstructed, folded, or not clearly visible. The generation of positioning feedback typically requires an image of the entire currency item, however in some cases, or specific regions of interest (ROIs) may suffice. Positioning feedback may be provided to a user in various formats (e.g., visual, audible, and/or tactile). The positioning feedback is typically intuitive. For example, the feedback and positioning feedback may be provided through a speaker 55 in the validation device.

One possible method for providing positioning feedback embraced by the present invention is as follows. First, in step 610, information corresponding to a currency item's position and orientation are derived. Next, in step 620, the positioning feedback is generated and communication to indicators that inform a user how to reposition the currency item. This process is iterated until the currency item is in the proper position/orientation.

The positioning feedback/indicators may be embodied in a variety of ways. For example, an indication of good/bad positioning may be conveyed via dedicated colors and/or lights. Indicator lights may also specify the direction the currency item should be moved (e.g., left/right, up, down, closer/further, and/or various forms of rotation). Positioning feedback/indicators may inform a user of an obstructed view. Positioning feedback/indicators may be audible or tactile. Audio indicators may be any combination of sounds, tones, "grunts", or spoken words. The positioning feedback/ indicators may include visual text/images projected into the validation device field of view. This feedback may visually indicate where a currency item should be located (at least initially). The various types of feedback/indicators may be combined.

Figure 13:
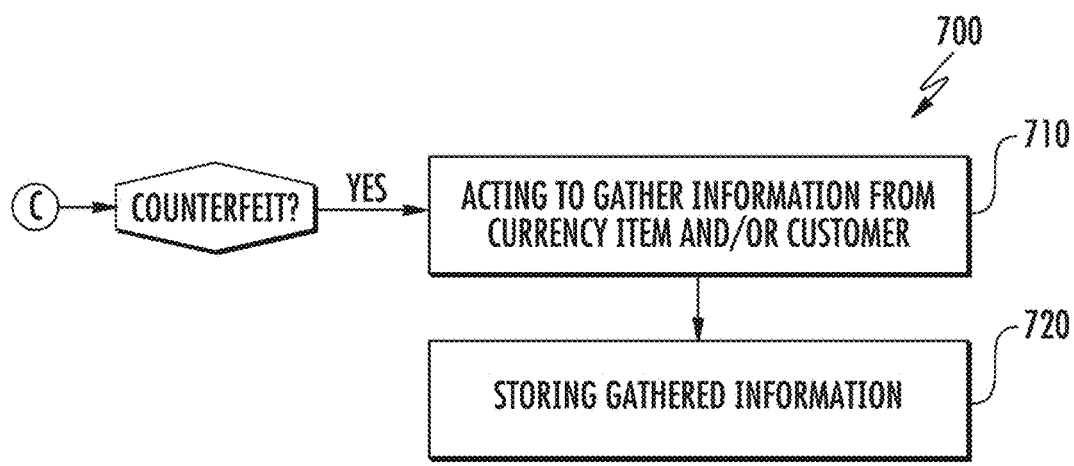
FIG. 13 is a flow diagram of a method for currency validation at a point of sale, according to various embodiments.

Referring now to FIG. 13, a flow diagram of a method 700 for currency validation at a point of sale such as in point of sale system 100 is provided, according to various embodiments. If validation step 460 (FIG. 10) finds the currency item to be counterfeit, the processor acts to gather information from the currency item and/or the customer at the point of sale (step 710). Handling customers in possession of counterfeit currency items at checkout is problematic. The results of the validation process should not distress or harm an innocent customer, but on the other hand, steps should be taken to ensure that the counterfeit is taken out of circulation and that the appropriate information is provided to authorities for an investigation. The present invention embraces methods for indicating and collecting information in response to a validation process.

In various embodiments, the validation device 10 provides a unique visual indication only to the operator (i.e., cashier, user, etc.) that a counterfeit has been detected, without alerting the customer or bystanders in any way. The customer is asked to provide a valid photo identification (e.g., driver's license) and the photo identification (i.e., photo-ID) will be scanned and recorded. The image of the counterfeit item, a transaction record, and the photo-ID image will be stored and made available to the law enforcement agencies or product manufacturers.

In various embodiments, the CVAL device 10 includes a multi-color illuminator, which could be used as an indication of authenticity (e.g., GREEN=valid, RED=counterfeit). The illumination of an item using a specific color (or color combination) indicates authenticity. When a counterfeit is detected, an image of the counterfeit item is automatically stored with transaction. The operator may repeat the verification process or use a secondary validation method (e.g., use a chemical pen to enhance the validation process).

In another possible embodiment, a customer is notified that the item is not authentic and his/her photo ID is requested to be imaged/recorded. If the customer is compliant, then he/she does not incur a loss. If the customer refuses to provide ID, a security camera 300 in communication with the validation device 10 may be used to surreptitiously capture an image of the customer. The information gathered may be stored (step 720) for future investigations or could be used with other stored information to facilitate "global" tracing of the counterfeit money or merchandise.

The main priority for any validation method is accuracy. There is, however, a substantial cost for highly accurate performance. The present invention embraces introducing a controlled chemical/substance to currency items, documents, or merchandise to improve the accuracy of the multi-spectrum validation device (i.e., before performing method 400 of FIG. 10).

In various embodiments, the unique chemical/substance is applied to the currency, document, or merchandise immediately before authentication. In another possible embodiment, the unique chemical/substance may be applied to a printed document, label, or packaging (e.g., a chemical in the ink used to print the document) during fabrication. In operation, the multispectral images may be analyzed to detect a unique feature or characteristic corresponding to the chemical/substance. When illuminated with a particular spectral profile, the chemical/substance may reveal an imprinted pattern, text, or number.

Figure 14:
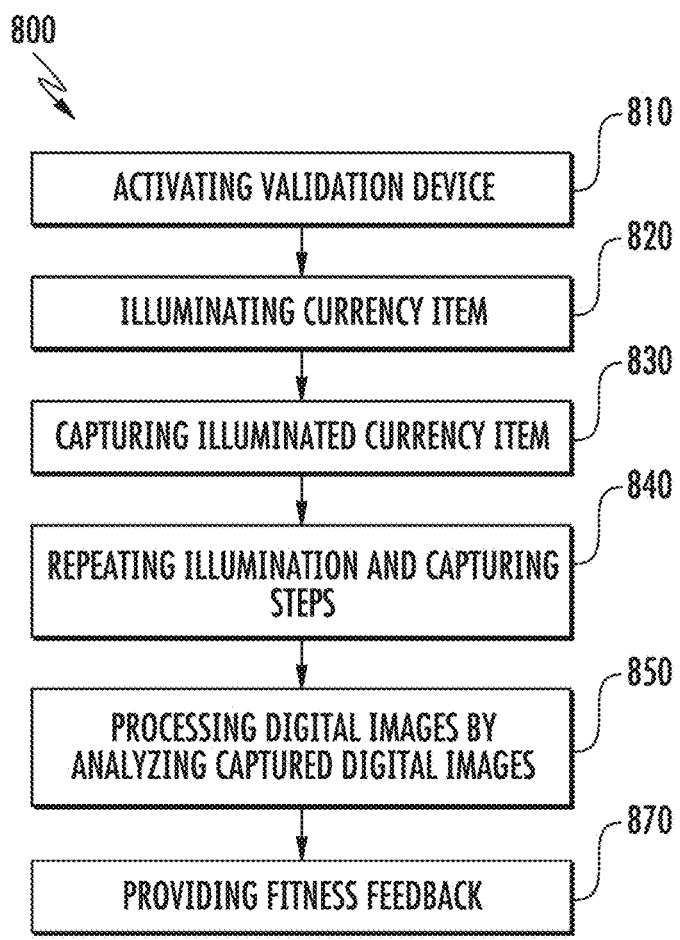
FIG. 14 is a flow diagram of a method for determining the fitness of a banknote, according to various embodiments of the present invention.

Referring now to FIG. 14, a method 800 for determining the fitness of a currency item (e.g., a banknote) is provided, according to various embodiments of the present invention. Every currency in the world has specifications for conditions when it is taken out of circulation. For example, the United States Federal Reserve provides rules (i.e., "Fitness Guidelines") for validating the acceptability of Federal Reserve Notes (i.e., FRN, paper money, banknotes, currency, etc.). Banks (and other depositories) typically use special high-speed validation systems to evaluate the fitness of bills (e.g., check the series-design, year of issue, amount of soiling, amount of print wear, tears, repairs, etc.) Due to the cost of these systems, they are typically found only at centralized locations. The present invention embraces methods for determining the "fitness" of currency items at other locations. In this case, speed may be sacrificed for cost. The methods utilize a portable validation device 10 capable of multi-spectrum illumination/imaging. The portability of the validation device enables fitness validation at a point of sale or local bank/depository.

In various embodiments of a method for determining fitness as depicted in FIG. 14, a currency item is illuminated and imaged using the multi-spectrum validation device 10 as in steps 420 through 440 of FIG. 10. More specifically, the validation device is activated in step 810. The currency item is illuminated in step 820. The illuminated currency item is captured in step 830. The illumination and capturing steps are repeated in step 840. The digital images are processed in step 850. In step 850 of processing the digital images in the method 800 for determining the fitness of the banknote, the captured images are analyzed (e.g., optical character recognition) to determine the denomination and series of the banknote. If the banknote's age is not acceptable, fitness feedback would be provided to a user in step 870 instructing them to remove the currency item from circulation.

In various embodiments, a currency item is illuminated and imaged using the multi-spectrum validation device 10. The captured images may be analyzed (e.g., reflectance measured) in processing step 850 to determine the soiling and print quality of the currency banknote. If unacceptable, fitness feedback may be provided in step 870 to a user instructing him/her to remove the currency item from circulation.

In various embodiments in method 800 for determining the fitness of a banknote, a currency item is illuminated and imaged using the multi-spectrum validation device 10 (steps 820 through 840). The captured images are analyzed (e.g., reflectance measured) to determine the shape and to detect tears, holes, tape, and/or missing portions in step 850 by analyzing the captured digital images. If unacceptable, fitness feedback may be provided to a user instructing him/her to remove the currency item from circulation (step 870).

Section IV: Imaging Improvement Methods for Validation

Validation using multispectral illumination/imaging requires control of the illumination and image acquisition parameters in order to optimize image quality, optimize repeatability (e.g., two different devices operate similarly), and allow for similar processing of images captured under different conditions. The present invention embraces calibration methods to "normalize" images to one another and between devices so they can be processed similarly.

Figure 16:
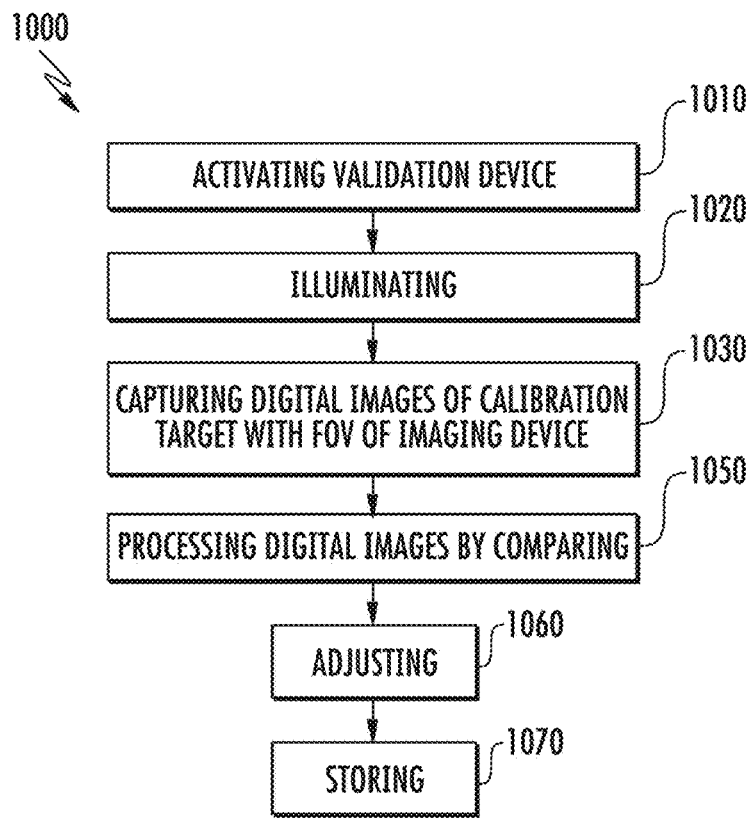
FIG. 16 is a flow diagram of a method for calibrating a multi-spectral imaging device, according to various embodiments of the present invention.

Referring now to FIG. 16, a method 1000 for calibrating a multi-spectral imaging device (e.g., validation device 10) is provided according to various embodiments. The method 1000 for calibrating the multi-spectral imaging device comprises activating the validation device (step 1010) and then illuminating and capturing digital images of the calibration target using a different spectral-profile illumination for each digital image (steps 1020 and 1030 respectively), comparing the captured digital images to a set of standard values in a step for processing the digital images (step 1050), adjusting the imaging device's imaging parameters based on the comparison to obtain a set of calibrated imaging parameters, wherein each calibrated imaging parameter in the set of calibrated imaging parameters corresponds to a particular spectral-profile illumination (step 1060), and storing (step 1070) the calibrated imaging parameters on the imaging device for future multi-spectral imaging and validation (i.e., steps 420 through 470 of FIG. 10).

Calibration may be achieved using a variety of techniques (e.g., automatic gain control, calibrations, etc.) applied either individually or in combination to normalize/equalize the captured digital images. In various embodiments, automatic or preset exposures are assigned for each spectral profile illumination. In various embodiments, automatic or preset illumination intensities may be assigned for each spectral profile illumination. In various embodiments, automatic or preset image gains are assigned for each spectral profile illumination. In these cases, the assignment of the parameters (i.e., calibration) may occur when the device is fabricated or installed. Alternatively, the calibration may occur as a periodic (e.g., scheduled) adjustment or when the application/environment is changed.

In various embodiments, the calibration includes using a multi-spectral validation device 10 to capture multiple spectral profile images of a calibration target that has particular color/gray-scale values. The captured images are then analyzed and compared to the known values of the calibration target. Next, the illumination/imaging parameters are adjusted (e.g., illumination strength, exposure time, image gain) for each of the spectral profiles. The adjustment may be automatic or manual and the parameters are adjusted until the normalization is achieved. The final parameter settings are then saved on the validation device and used by the validation device for subsequent illumination/imaging.

Figure 17:
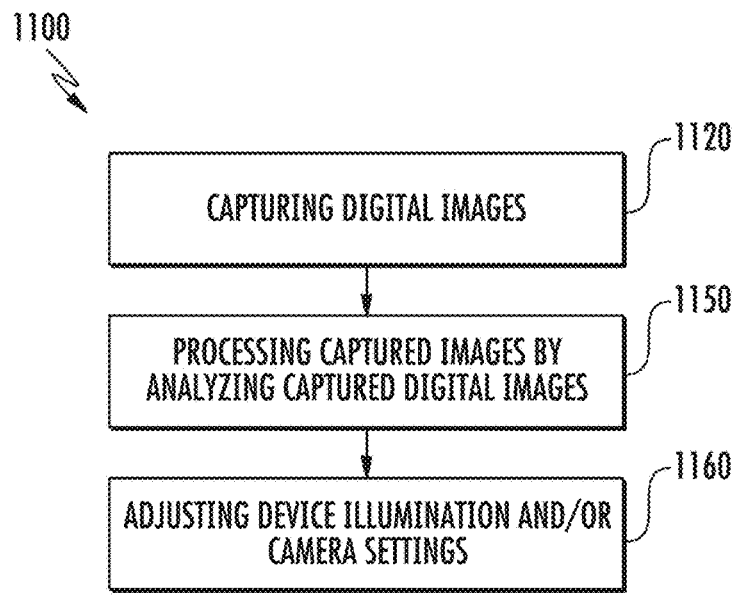
FIG. 17 is a flow diagram of a method for automatically adjusting imaging parameters for the multi-spectral imaging device is provided, according to various embodiments.

Referring now to FIG. 17, according to various embodiments, a method 1100 for automatically adjusting imaging parameters for the multi-spectral imaging device is provided, according to various embodiments. A digital image of the item is captured using a particular spectral profile illumination (step 1120). The captured digital image of the item (e.g., a currency item) is analyzed in a processing step (step 1150) and the imaging parameters adjusted (step 1160) for each spectral profile illumination based on the analysis. In various embodiments, automatic exposure, illumination strength, and/or image gain may be adjusted during the validation device's operation based on data from the first illumination (i.e., the "first flash"). Using this data, the parameter settings for each of the multi-spectral images are adjusted to normalize for the subsequent illumination/imaging.

Validation using the multi-spectral illumination/imaging relies on subtle differences in image levels. As a result, variances in illumination/imaging affect the intended results. Such variances may result from variations associated with the light sources or the image sensor (e.g., thermal variations, operating-characteristic variations, exposure-time variations, etc.). The present invention embraces real-time control of the illumination/imaging settings (i.e., parameters) to counteract these variances and maintain control of the image levels.

There are multiple embodiments for the real-time control, all using feedback from the validation device's light sources 16 to monitor the rate at which illuminance is being delivered (i.e., intensity). As exposure is proportional to illuminance multiplied by exposure time, exposure times can be adjusted to achieve the desired total exposure ratio between all spectral profiles.

In all possible embodiments, a validation device 10 is factory calibrated to determine the optimal exposure ratio. This optimal ratio is known as the target ratio and is recorded in the validation device's firmware. During operation, an initial exposure level is determined by taking an initial exposure (likely using a combination of LEDs, or perhaps IR only) to get a sense of the imaged item. The initial exposure produces a first image. The first image is used to estimate the appropriate overall exposure level required.

In various embodiments, a small reference target attached to the validation device (e.g., positioned in the periphery of the field of view, occupying the perimeter of the field of view, etc.). This reference target may include a white portion and/or may include multi-colored portions. The target reflects a small amount of light from the light sources (during the initial exposure) back to the image sensor. The signal captured on the image sensor 28 corresponding to the reference target is used to adjust the exposure times of the light sources. In some cases, the adjustment also uses the light source's response to temperature. For example, after the initial exposure time ratios are set, a string of exposures would generate captured images, one for each spectral profile. The signal captured on the image sensor 28 corresponding to the reference target for these exposures is then used to further adjust the exposure ratio (e.g., closer to the desired exposure ratio).

In various embodiments, a light source sensing subsystem 70 may be used to monitor exposure levels. The light source sensing subsystem 70 may include a photodiode 72 that is positioned to pick off a small amount of light every time a light source 16 is activated. The signal from this photodiode 72 provides reference information used for adjusting the intensity of the light sources 16. Alternatively, the signal from the photodiode 72 may be used as a trigger for the sensor shutter. In this case, a trigger signal would simultaneously turn on a light source 16 and open the image sensor's 28 shutter. An integrating circuit may be used to integrate the signal from the photodiode 72 until a desired level is reached. When the desired level is reached the image sensor's 28 shutter would be closed. The real-time integration of the sensor signal ensures the proper exposure ratios. This process may be repeated for each spectral profile.

In various embodiments, a light source sensing subsystem 70 is used to generate real-time feedback and integration. This particular embodiment is the same as the last particular embodiment but rather than using a photodiode 72, a portion of the image sensor 28 is used as the sensing subsystem, and the feedback signal is generated by the image sensor's response to light reflected from a reference target.

In various embodiments, the light sources (e.g., light emitting diode, LED) 16 are controlled to prevent temperature drifts in intensity. Temperature affects LED efficiency. When an LED is turned on, its efficiency can change until a thermal equilibrium is reached. To prevent thermal drift, the LEDs are activated and allowed to reach thermal equilibrium. The activation time (i.e., burn-in time) may be set using an ambient temperature sensor, or set during fabrication as a result of testing. After the burn-in time, the image sensor's shutter would be opened to capture an image. Calibration of the collected image may then be based on the sensed temperature or cataloged data.

In various embodiments, each light source (e.g., LED) is assigned a particular initial exposure. The initial exposure is followed a second exposure, which is fine-tuned for processing. This method could be used with or without the initial multi-color single exposure. If the single exposure is used, the single exposure is used as a basis for determining the initial exposures for the spectral profiles. If the single exposure is not used, then the initial spectral profile's exposures could be used to estimate the desired exposure of the next initial color exposure. Results from each initial color exposure are processed to determine exposure refinement for the second exposures. The reference target described above could be used for feedback, or a predetermined quiet region, identified in an image during the initial color exposures, could be used to refine the secondary exposures to optimize the exposure ratios.

When using multi-spectral illumination/image for currency validation, a fold in a currency item may cause shadows in each spectral profile illumination. As a result, the shadow pattern in the images captured from the different illuminations may be used to reduce noise and non-uniformities. This approach can also suppress some features, like serial numbers and magnetic strips.

Figure 18:
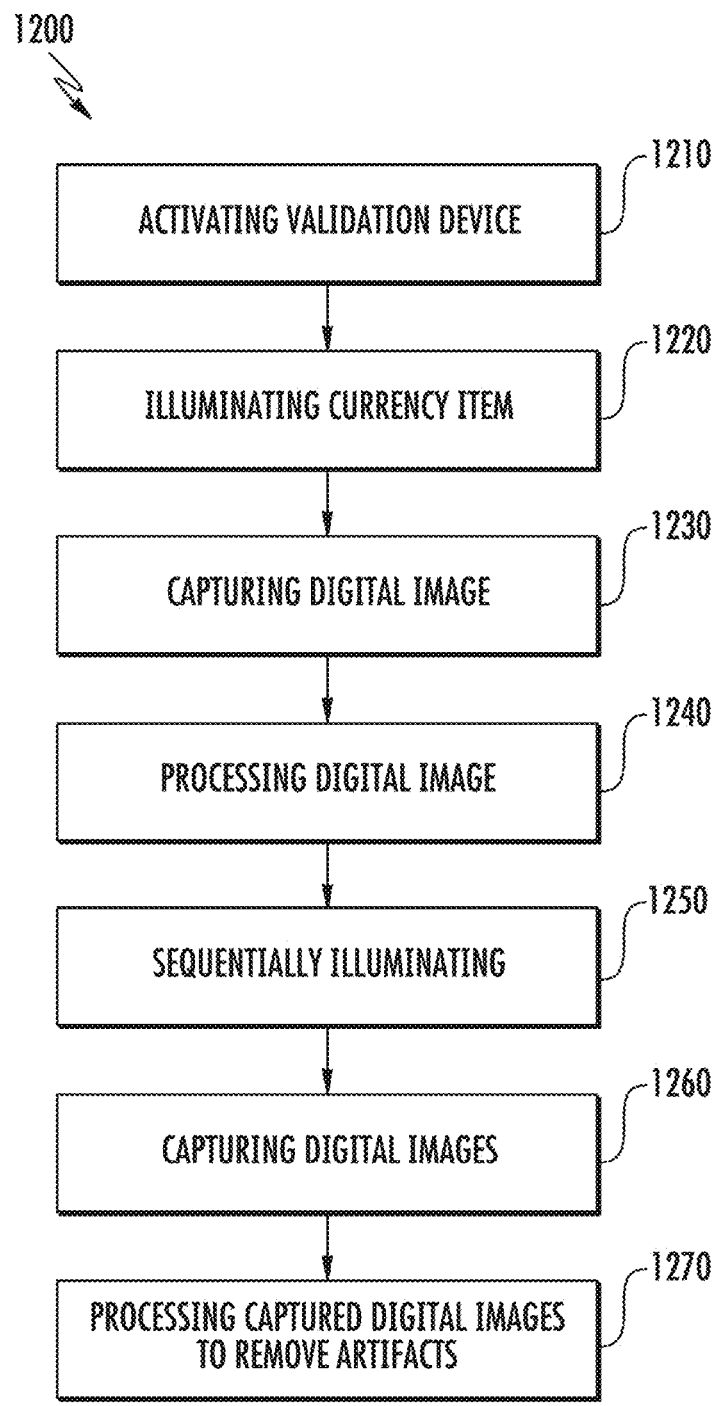
FIG. 18 is a flow diagram of a method for removing artifacts from images for currency validation, according to various embodiments.

Referring now to FIG. 18, according to various embodiments, a method 1200 for removing artifacts from images for currency validation is provided. The method for removing artifacts from images for currency validation comprises activating the validation device (step 1210), illuminating the currency item with light having a particular spectral profile (step 1220), capturing a digital image of the illuminated currency item (step 1230), processing the digital item to compute an average pixel value for the currency item (step 1240), sequentially illuminating the currency item with light having different spectral profiles (step 1250), capturing digital images of the currency item for each spectral profile (step 1260), and processing the captured digital images to remove artifacts by normalizing the pixels in the captured digital image by the average pixel value for the currency item (step 1270).

In various embodiments, an illumination having a spectral profile in near infrared (NIR) band would be used to minimize illumination artifacts (e.g., shadows) by normalizing validation images to an NIR image. Colored inks often have no contrast in NIR, (i.e., are invisible in NIR image). As the colored ink forms the information measured during validation, it remains relatively intact after normalizing the validation images to the NIR image. For currency items that use a significant amount of black ink (i.e., are visible in the NIR image), the black ink will provide no significant benefit to spectral analysis as it looks black to all colors. As a result, the NIR normalization process is not significantly affected by the information formed by the black ink.

In various embodiments, other spectral profiles may be used for normalization. For example, a plurality of images may be captured for each spectral profile in rapid succession (i.e., to minimize any motion that might occur between frames). The images are then processed to identify the banknote, spatially bin the reflectivity data, and adjust for exposure differences between images. Next, the average NIR return over the banknote in the images is calculated. Then each image is normalized by the image's ratio of the NIR data set to its average NIR. At this point, further normalization algorithms may be applied before validating the banknote.

While validation of banknotes has been described, other currency items such as coins may be validated by the validation device by the same or similar methods according to various embodiments.

Example Embodiments

A1. A currency validation (CVAL) device, comprising:
an illumination subsystem having one or more light sources and optics for illuminating items in a field of view;
an imaging subsystem having an image sensor and optics for capturing digital images of items in the field of view while illuminated by the illumination subsystem; and a processor communicatively coupled to the illumination subsystem and the imaging subsystem, wherein the processor is configured by software to:
activate one or more light sources in the illumination subsystem to illuminate a currency item,
capture an image of illuminated currency item, and
repeat activating one or more light sources and capturing digital images until a plurality of digital images of the currency item have been captured, and
process the plurality of images to validate the currency item.

A2. The CVAL device according to embodiment A1, further comprising a mode-selection switch communicatively coupled to the processor for placing the CVAL device into either an indicia reading mode or a currency validation mode, wherein in indicia reading mode the processor is configured by software to:
activate one or more light sources in the illumination subsystem to illuminate an indicia item,
capture at least one image of the illuminated indicia item, and
process the at least one captured image to decode at least one indicium.

A3. The CVAL device according to embodiments A1 or A2, wherein the subsystems and the processor are contained within a handheld housing.

A4. The CVAL device according to embodiments A1 or A2, wherein subsystems and the processor are contained within a point of sale counter having a window onto which the currency item is placed for illumination and imaging.

A5. The CVAL device according to embodiments A1 or A2, comprising a user-interface subsystem communicatively coupled to the processor for displaying (i) the results of the currency validation or (ii) feedback to facilitate the positioning of the currency item.

A6. The CVAL device according to embodiment A1, wherein subsystems and the processor are contained within a kiosk having a window onto which the currency item is placed for illumination and imaging.

A7. The CVAL device according to embodiment A1, wherein the plurality of light sources may be activated individually or in combination to produce light of various spectral profiles.

A8. The CVAL device according to embodiment A7, wherein the illumination subsystem comprises multiple LED arrays, wherein each LED array includes a plurality of LEDs configured to radiate light in the same spectral band and wherein the LED arrays are independently controlled by control signals generated by the processor.

A9. The CVAL device according to embodiment A8, wherein the control signal for a particular LED array controls the intensity and duration of the light emitted by the particular LED array.

A10. The CVAL device according to embodiment A8, wherein the LED arrays may be activated individually or in groups and in a particular sequence to illuminate an item with a variety of spectral bands of light.

A11. The CVAL device according to embodiment A8, wherein the control signals control the imaging subsystem to capture digital images synchronously with the activation/deactivation of the arrays.

A12. The CVAL device according to embodiment A11, wherein each captured digital image corresponds to a different illumination spectral profile.

A13. The CVAL device according to embodiment A1, wherein the illumination subsystem's optics comprise one or more filters, wherein the one or more filters may be mechanically moved over the illumination subsystem's one or more light sources so as to change the spectral profile of the illumination subsystem.

A14. The CVAL device according to embodiment A13, comprising a plurality of absorptive filters.

A15. The CVAL device according to embodiment A14, wherein the filters are arranged around a rotatable wheel so that a particular filter may positioned in front of the one or more light sources by rotating the wheel.

A16. The CVAL device according to embodiment A14, wherein the filters are arranged around multiple rotatable wheels, wherein the multiple rotatable wheels are stacked in front of the one or more light sources so that a combination of filters may be positioned in front of the one or more light sources by rotating the multiple rotatable wheels.

A17. The CVAL device according to any of embodiments A13-A16, wherein the illumination subsystem's one or more light sources comprise light sources having different spectral profiles, wherein the activation of the one or more light sources is determine by the position of the rotatable wheel.

A18. The CVAL device according to embodiment A13, comprising a dichroic filter.

A19. The CVAL device according to embodiment A18, wherein the dichroic filter is mechanically rotated around an axis transverse with the direction of illumination to change the spectral profile of the illumination subsystem.

A20. The CVAL device according to embodiment A19, wherein the illumination subsystem's one or more light sources comprise light sources having different spectral profiles, wherein the activation of the one or more light sources is determined by the position of the dichroic filter.

A20b. The CVAL device according to any of embodiment A18, wherein the illumination subsystem's one or more light sources comprise a white light LED.

A21. The CVAL device according to any of embodiment A1, wherein the imaging subsystem's optics comprise one or more filters, wherein the one or more filters may be mechanically moved over the imaging subsystem's image sensor so as to change the spectral profile of the captured digital image.

A22. The CVAL device according to embodiment A21, comprising a plurality of absorptive filters.

A23. The CVAL device according to embodiment A22, wherein the filters are arranged around a rotatable wheel so that a particular filter may positioned in front of the image sensor by rotating the wheel.

A24. The CVAL device according to embodiment A22, wherein the filters are arranged around multiple rotatable wheels, wherein the multiple rotatable wheels are stacked in front of the image sensor so that a combination of filters may be positioned in front of the image sensor by rotating the multiple rotatable wheels.

A25. The CVAL device according to any of embodiments A21-A24, wherein the settings of the imaging subsystem's sensor is determine by the position of the rotatable wheel.

A26. The CVAL device according to embodiment A21, comprising a dichroic filter.

A27. The CVAL device according to embodiment A26, wherein the dichroic filter is mechanically rotated around an axis transverse with the optical axis of the image sensor so as to change the spectral profile of the captured digital image.

A28. The CVAL device according to embodiment A27, wherein the settings of the imaging subsystem's sensor is determine by the position of the dichroic filter.

A29. The CVAL device according to embodiment A1, comprising (i) a first linear polarizer positioned in front of the illumination subsystem's one or more light sources, and (ii) a second linear polarizer positioned in front of the imaging subsystem's imaging sensor, wherein the first linear polarizer is orthogonal with the second linear polarizer to reduce specular reflections in the captured digital images.

A30. The CVAL device according to embodiment A2, comprising an aiming subsystem communicatively coupled to the mode-selection switch and having one or more aiming-light sources and optics for projecting (i) a first targeting pattern into the field of view when the CVAL device is in indicia reading mode and (ii) a second targeting pattern into the field of view when the CVAL device is in CVAL mode.

A31. The CVAL device according to embodiment A30, wherein the aiming subsystem's optics include a diffractive optical element for creating the first targeting pattern and the second targeting pattern.

A32. The CVAL device according to embodiment A30, wherein the aiming system's optics include shaping optics for creating the first targeting pattern and the second targeting pattern.

A33. The CVAL device according to embodiment A32, wherein the shaping optics include a first aperture for the first targeting pattern and a second aperture for the second targeting pattern.

A34. The CVAL device according to embodiment A30, wherein the aiming system's one or more aiming-light sources include a first laser for radiating light for the first targeting pattern and a second laser for radiating light for the second targeting pattern.

A35. The CVAL device according to embodiment A30, wherein the first targeting pattern and the second targeting pattern are different sizes.

A36. The CVAL device according to embodiment A30, wherein the first targeting pattern and the second targeting pattern are different shapes.

A37. The CVAL device according to embodiment A30, wherein the first targeting pattern the second targeting pattern are different colors.

A38. The CVAL device according to embodiment A1, comprising a power subsystem for supplying power to the CVAL device, wherein the power subsystem includes:
a USB connector for attaching to a USB power supply,
an electrical cable running between the USB connector and the CVAL device, and
a storage element for storing energy from the USB power supply and supplying energy to the CVAL device when the CVAL device requires energy in excess of the USB power supply's limits.

A39. The CVAL device according to embodiment A38, wherein the storage element is located within the electrical cable's outer covering.

A40. The CVAL device according to embodiment A38, wherein the storage element is a super capacitor.

A41. The CVAL device according to embodiment A38, wherein the storage element is a battery.

B1. A point of sale system, comprising:
a cash register for registering and calculating transactions at a point of sale;
a handheld imager commutatively coupled to the handheld imager that is operable in either (i) an indicia reading mode for reading indicia as part of a checkout process or (ii) in CVAL mode for validating currency as part of a checkout process; wherein
in CVAL mode, the handheld imager illuminates an item in a field of view with illumination flashes of different spectral profiles and acquires at least one image for each illumination flash, and wherein
in indicia reading, mode the handheld imager captures a digital image of an item in the field of view, and processes the digital image to recognize and decode one or more indicia found in the digital image.

B2. The point of sale system according to embodiment B1, wherein the handheld imager's mode of operation is set by signals from processing circuitry in the handheld imager, wherein the signals are generated by the processing circuitry in response to an analysis of the captured image.

B3. The point of sale system according to embodiment B2, wherein the handheld imager's mode of operation is set by the information obtained from a decoded indicium.

B4. The point of sale system according to embodiment B2, wherein the handheld imager is switched from indicia reading mode to verification mode if the analysis of the captured image finds no indicium.

B5. The point of sale system according to embodiment B2, wherein the handheld imager is switched from indicia reading mode to verification mode if the analysis of the captured image finds a currency item.

B6. The point of sale system according to embodiment B5, wherein the analysis of the captured image includes optical character recognition (OCR).

B7. The point of sale system according to embodiment B5, wherein the analysis of the captured image includes feature recognition.

B8. The point of sale system according to embodiment B1, wherein the handheld imager's mode of operation is set by signals from the cash register in response to a transaction event.

B9. The point of sale system according to embodiment B8, wherein the transaction event is the completion of the registering of items and the start of payment.

B10. The point of sale system according to embodiment B1, wherein the handheld imager's mode of operation is set by signals from interface circuitry in the handheld imager, wherein the signals are generated by the interface circuitry in response to user input.

B11. The point of sale system according to embodiment B10, wherein the interface circuitry includes a trigger switch and the handheld imager's mode of operation is set by a movement of the trigger switch.

B12. The point of sale system according to embodiment B10, wherein the movement of the trigger switch includes a particular duration and/or pattern of trigger switch movements.

B13. The point of sale system according to embodiment B12, wherein the trigger switch movements create signals resulting from mechanical, optical, or magnetic switching.

B14. The point of sale system according to embodiment B10, wherein the interface circuitry includes a microphone and the handheld imager's mode of operation is set by voice command spoken into the microphone.

B15. The point of sale system according to embodiment B1, comprising a banknote holder having a substrate with a reflective surface onto which a banknote is placed for verification so that illumination passes through the banknote, reflects from the reflective surface, passes again through the banknote, and returns to the handheld imager.

B16. The point of sale system according to embodiment B15, wherein the reflective surface is a metallic mirror.

B17. The point of sale system according to embodiment B15, wherein the reflective surface is a dichroic reflector that reflects light of a particular spectral profile.

C1. A method for currency validation (CVAL), comprising the steps of:
providing a CVAL device capable of illuminating items in a field of view with a plurality of spectral profiles and capable of capturing digital images of the items for each illumination;
positioning a currency item within the CVAL device's field of view;
triggering the CVAL device to begin operation;
illuminating the currency item with light having a particular spectral profile;
capturing a digital image of the illuminated currency item;
repeating the steps of illuminating and capturing to obtain a plurality of digital images of the currency item illuminated by different spectral profiles;
processing the digital images; and
validating the currency item using the results of the processing.

C2. The method for CVAL according to embodiment C1, wherein the step of processing the digital images comprises:
recognizing characters or features on the currency item;
identifying the currency item based on the recognized features; and
retrieving from memory one or more comparison standards for the identified currency item from a library of comparison standards.

C3. The method for CVAL according to embodiment C2, wherein the step of validating the currency item comprises:
comparing the plurality of processed digital images to the one or more comparison standards.

C4. The method for CVAL according to embodiment C2, wherein the step of validating the currency item, comprises:
identifying one or more regions of interest on the currency item;
obtaining pixel levels from the one or more regions of interest from each digital image; and
comparing the pixel levels from the one or more regions of interest to the one or more comparison standards.

C5. The method for CVAL according to embodiment C1, wherein the step of validating the currency item comprises:
identifying multiple regions of interest on the currency item;
obtaining pixel levels each from the multiple regions of interest for each digital image; and
comparing, for each digital image, the pixel levels from a particular region of interest to other regions of interest.

C6. The method for CVAL according to embodiment C1, wherein the step of processing the digital images comprises:

recognizing characters or features on the currency item; and recording the recognized characters or features to a computer readable memory.

C7. The method for CVAL according to embodiment C1, wherein the CVAL device is handheld.

C8. The method for CVAL according to embodiment C1, wherein the CVAL device is fixedly mounted.

C9. The method for CVAL according to embodiment C1, wherein the CVAL device is integrated with a point of sale system, wherein the CVAL device's field of view aligned with the point of sale system's barcode reader.

C10. The method for CVAL according to embodiment C1, further comprising the step of:

providing feedback based on the CVAL.

C11. The method for CVAL according to embodiment C10, wherein the feedback is audible, tactile, or visual.

C12. The method for CVAL according to embodiment C10, wherein the feedback indicates that the currency item is valid or invalid.

D1. A method for adjusting the mode of operation in a dual-mode currency validation (CVAL) device, comprising the steps of:

providing a dual-mode CVAL device capable of operating in either an indicia reading mode or a CVAL mode;

positioning an item within the field of view of the CVAL device;

triggering the CVAL device to capture a digital image of the item;

analyzing the captured digital image;

adjusting the mode of operation of the CVAL device based on the analysis of the captured digital image so that (i) in a CVAL mode, digital images are automatically acquired and processed to validate currency or (ii) in indicia reading mode, digital images are automatically acquired and processed to read indicia.

D2. The method for adjusting the mode of operation in a dual-mode CVAL device according to embodiment D1, wherein the CVAL device is handheld.

D3. The method for adjusting the mode of operation in a dual-mode CVAL device according to embodiment D1, wherein the step analyzing the captured image comprises:

detecting the presence or absence of a barcode within the captured digital image.

E1. A method for aligning a currency item with a CVAL device for currency validation (CVAL), comprising the steps of:

providing a CVAL device having an optimal position for imaging a currency item;

positioning a currency item in front of the CVAL device;

triggering the CVAL device to capture digital images of the currency item;

analyze the captured digital images to determine the currency item's position relative to the optimal position to; and based on the analysis, providing feedback to a user to facilitate the alignment of the currency item with the optimal position.

F1. A method for aligning a currency item with a CVAL device for currency validation (CVAL), comprising the steps of:

providing a CVAL device;

positioning a currency item in front of the CVAL device;

triggering the CVAL device to capture digital images of the currency item;

analyzing the captured digital images to determine if at least a portion of the currency item is obscured; and based on the analysis, providing feedback to a user indicating that the currency item is obscured.

F2. The method according to embodiments E1 or F1, wherein the feedback is visual, audible, and/or tactile.

F3. The method according to embodiments E1 or F1, wherein the feedback comprises an illumination of at least one visual indicator on the CVAL device.

F4. The method according to embodiment F3, wherein the illumination is colored corresponding to the feedback.

F5. The method according to embodiments E1 or F1, wherein feedback comprises a sound generated by a speaker in the CVAL device.

F6. The method according to embodiment F5, wherein the feedback comprises tones, beeps, grunts, and/or spoken words corresponding to the feedback.

F7. The method according to embodiments E1 or F1, wherein feedback comprises an image projected by CVAL device into the CVAL device's field of view.

F8. The method according to embodiment F7, wherein the image comprises a complete or partial image of a frame indicating where the currency item should be positioned.

F9. The method according to embodiment F7, wherein the image is colored corresponding to the feedback.

G1. A method for currency or product validation at a point of sale, comprising the steps of:

providing a validation device communicatively coupled to a point of sale system and capable of (i) illuminating items in a field of view with a plurality of spectral profiles and (ii) capturing digital images of the items for each illumination;

positioning an item within the CVAL device's field of view;

triggering the validation device to begin operation;

illuminating the item with light having a particular spectral profile;

capturing a digital image of the illuminated item;

repeating the steps of illuminating and capturing to obtain a plurality of digital images of the item illuminated by different spectral profiles;

processing the digital images;

validating the item based on the results of the processing; and if the validation finds the item counterfeit, then acting to gather information from the item and/or the customer.

G2. The method for currency or product validation at a point of sale according to embodiment G1, wherein the step of acting to gather information from the item and/or the customer comprises:

displaying a message on the point of sale system's display requesting a valid identification from the customer.

G3. The method for currency or product validation at a point of sale according to embodiment G2, further comprising:

capturing an image of the customer's identification.

G4. The method for currency or product validation at a point of sale according to embodiment 83, wherein the step of acting to gather information from the item and/or the customer comprises:

surreptitiously capturing an image of the customer using a camera that is communicatively coupled to the point of sale system.

G5. The method for currency or product validation at a point of sale according to embodiment G1, wherein the step of acting to gather information from the item and/or the customer comprises:

capturing an image of the item.

G6. The method for currency or product validation at a point of sale according to embodiments G3, G4, or G5, further comprising the step of:
storing the gathered information in a database available to law enforcement agencies or product manufacturers.

G7. The method for currency or product validation at a point of sale according to embodiment 83, wherein the step of acting to gather information from the item and/or the customer comprises:
displaying a message on the point of sale system's display requesting further testing of the item.

H1. A method for validating currency, documents, or merchandise, comprising the steps of:
applying a chemical substance to a currency, document, or merchandise item;
providing a validation device capable of illuminating a field of view with a plurality of spectral profiles and capable of capturing digital images of the field of view for each illumination;
positioning the item within the validation device's field of view;
illuminating the item with light having a particular spectral profile;
capturing a digital image of the illuminated item;
repeating the steps of illuminating and capturing to obtain a plurality of digital images of the item illuminated by different spectral profiles;
processing the digital images; and
validating the item based on the results of the processing.

H2. The method for validating currency, documents, or merchandise according to embodiment H1, wherein the step of validating the item comprises:
recognizing unique features or characteristics of the chemical substance under illumination.

I1. A method for determining the fitness of a banknote, comprising the steps of:
providing a portable imaging device capable of illuminating a field of view with a plurality of spectral profiles and capable of capturing digital images of the field of view for each illumination;
positioning the banknote within the validation device's field of view;
illuminating the banknote with light having a particular spectral profile;
capturing a digital image of the illuminated banknote;
repeating the steps of illuminating and capturing to obtain a plurality of digital images of the banknote illuminated by different spectral profiles;
processing the digital images; and
determining the fitness of the banknote based on the results of the processing.

I2. The method for determining the fitness of a banknote according to embodiment I1, wherein the step of processing the digital images comprises:
recognizing the denomination and/or series of the banknote.

I3. The method for determining the fitness of a banknote according to embodiment I2, wherein the step of determining the fitness of the banknote comprises:
determining the age of the banknote from the recognized denomination and or series.

I4. The method for determining the fitness of a banknote according to embodiment I1, wherein the step of processing the digital images comprises:
evaluating pixels levels in the digital images to determine soiling of the banknote.

I5. The method for determining the fitness of a banknote according to embodiment I1, wherein the step of processing the digital images comprises:
evaluating pixels levels in the digital images to determine worn printing on the banknote, writing on the banknote, or tape on the banknote.

I6. The method for determining the fitness of a banknote according to embodiment I1, wherein the step of processing the digital images comprises:
recognizing characters in the digital images to determine printing defects on the banknote.

I7. The method for determining the fitness of a banknote according to embodiment I1, wherein the step of processing the digital images comprises:
recognizing edges in the digital images to determine rips or holes in the banknote.

I8. The method for determining the fitness of a banknote according to embodiment I1, wherein the step of providing a portable imaging device is at a point of sale.

I9. The method for determining the fitness of a banknote according to embodiment I1, wherein the step of providing a portable imaging device is at a bank.

J1. A method for calibrating a multi-spectral imaging device, the method comprising the steps of:
providing a multi-spectral imaging device capable of illuminating a field of view with a plurality of spectral-profile illuminations and capable of capturing digital images of the field of view for each spectral-profile illumination;
positioning a calibration target within the field of view of the multi-spectral imaging device;
capturing digital images of the calibration target using a different spectral-profile illumination for each digital image;
comparing the captured digital images to a set of standard values;
adjusting the imaging device's imaging parameters based on the comparison to obtain a set of calibrated imaging parameters, wherein each calibrated imaging parameter in the set of calibrated imaging parameters corresponds to a particular spectral-profile illumination; and
storing the calibrated imaging parameters on the imaging device for future multi-spectral imaging.

J2. The method for calibrating a multi-spectral imaging device according to embodiment J1, wherein the set of calibrated imaging parameters include the imaging device's image gain for each spectral-profile illumination.

J3. The method for calibrating a multi-spectral imaging device according to embodiment J1, wherein the imaging parameters include the imaging device's illumination intensity for each spectral-profile illumination.

J4. The method for calibrating a multi-spectral imaging device according to embodiment J1, wherein the imaging parameters include the imaging device's exposure duration for each spectral-profile illumination.

J5. The method for calibrating a multi-spectral imaging device according to embodiment J1, wherein the multi-spectral imaging device is a currency validation (CVAL) device.

J6. The method for calibrating a multi-spectral imaging device according to embodiment J1, wherein the multi-spectral imaging device is a barcode scanner.

J7. The method for calibrating a multi-spectral imaging device according to embodiment J1, wherein the multi-spectral imaging device is an optical character recognition (OCR) device.

K1. A method for automatically adjusting imaging parameters for a multi-spectral imaging device comprising the steps of:

providing a multi-spectral imaging device capable of illuminating a field of view with a plurality of spectral-profile illuminations and capable of capturing digital images of the field of view for each spectral-profile illumination;

positioning an item within the field of view of the imaging device;

capturing a digital image of the item using a particular spectral-profile illumination;

analyzing the digital image; and adjusting the imaging device's imaging parameters for each spectral profile illumination based on the analysis.

K2. The method for automatically adjusting imaging parameters for a multi-spectral imaging device according to embodiment K1, wherein the imaging parameters include the imaging device's image gain.

K3. The method for automatically adjusting imaging parameters for a multi-spectral imaging device according to embodiment K1, wherein the imaging parameters include the imaging device's illumination intensity.

K4. The method for automatically adjusting imaging parameters for a multi-spectral imaging device according to embodiment K1, wherein the imaging parameters include the imaging device's exposure duration.

K5. The method for normalizing a plurality of digital images according to embodiment K1, wherein the multi-spectral imaging device is a CVAL device.

K6. The method for normalizing a plurality of digital images according to embodiment K1, wherein the multi-spectral imaging device is a barcode scanner.

K7. The method for normalizing a plurality of digital images according to embodiment K1, wherein the multi-spectral imaging device is an optical character recognition (OCR) device.

L1. A method for controlling image exposure for currency validation, the method comprising the steps of:

providing a CVAL device capable of illuminating the field of view with a plurality of spectral profiles and capturing digital images of the field of view for each spectral profile, wherein the CVAL device has a reference target permanently positioned within a portion of the field of view;

illuminating the field of view with a particular spectral profile;

capturing a digital image of the field of view;

analyzing the portion of the captured digital image containing the reference target; and based on the analysis, adjusting the CVAL device's illumination and/or camera settings to control image exposure for currency validation, wherein currency validation comprises capturing a plurality of digital images of an item illuminated with different spectral profiles.

M1. A method for controlling image exposure for currency validation, the method comprising the steps of:

providing a CVAL device capable of illuminating the field of view with a plurality of spectral profiles and capturing digital images of the field of view for each spectral profile, wherein the CVAL device has a sensing subsystem configured to detect the intensity of the CVAL device's light sources;

illuminating the field of view with a particular spectral profile;

analyzing the signal from the sensing subsystem; and based on the analysis, adjusting the CVAL device's illumination and/or camera settings to control image exposure for currency validation, wherein currency validation comprises capturing a plurality of digital images of an item illuminated with different spectral profiles.

N1. A method for controlling image exposure for currency validation, the method comprising the steps of:

providing a CVAL device capable of illuminating the field of view with a plurality of spectral profiles and capturing digital images of the field of view for each spectral profile, wherein the CVAL device has a sensing subsystem configured to detect the temperature of the CVAL device's light sources;

illuminating the field of view with a particular spectral profile;

analyzing the signal from the sensing subsystem; and based on the analysis, adjusting the CVAL device's illumination and/or camera settings to control image exposure for currency validation, wherein currency validation comprises capturing a plurality of digital images of an item illuminated with different spectral profiles.

O1. A method for controlling image exposure for currency validation, the method comprising the steps of:

providing a CVAL device capable of illuminating the field of view with a plurality of spectral profiles and capturing digital images of the field of view for each spectral profile, wherein the CVAL device has a sensing subsystem configured to sense the exposure of the illumination;

illuminating the field of view with each spectral profile;

analyzing signals from the sensing subsystem for each spectral profile; and based on the analysis, adjusting the CVAL device's illumination and/or camera settings to control image exposures for currency validation, wherein currency validation comprises capturing a plurality of digital images of an item illuminated with different spectral profiles.

P1. A method for controlling image exposure for currency validation, the method comprising the steps of:

providing a CVAL device capable of illuminating the field of view with a plurality of spectral profiles and capturing digital images of the field of view for each spectral profile;

illuminating the field of view with each spectral profile in the plurality of spectral profiles and capturing an image of the field of view for each spectral profile.

analyzing the captured digital images; and based on the analysis, adjusting the CVAL device's illumination and/or camera settings to control image exposures for currency validation.

Q1. A method for removing artifacts from images for currency validation (CVAL), comprising the steps of:

providing a CVAL device capable of illuminating items in a field of view with a plurality of spectral profiles and capable of capturing digital images of the items for each illumination;

positioning a currency item within the CVAL device's field of view;

triggering the CVAL device to begin operation;

illuminating the currency item with light having a particular spectral profile;

capturing a digital image of the illuminated currency item;

processing the digital image to compute an average pixel value for the currency item;

sequentially illuminating the currency item with light having different spectral profiles;

capturing digital images of the currency item for each spectral profile;

processing the captured digital images to remove artifacts by normalizing the pixels in the captured digital image by the average pixel value for the currency item.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; U.S. Pat. No. D702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;

U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;

U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTI-FUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A currency validation (CVAL) device, comprising:
an illumination subsystem for illuminating a currency item in a field of view, wherein the illumination subsystem has a plurality of light sources, wherein each light source has a different spectral profile;
an imaging subsystem having an image sensor and a first optical assembly; and
a processor communicatively coupled to the illumination subsystem and the imaging subsystem, wherein the processor is configured to:
activate the plurality of light sources in the illumination subsystem in a predefined sequence to illuminate the currency item with different spectral profiles;
control the imaging subsystem to capture a plurality of images of the currency item, wherein each image of the plurality of images is associated with an illumination of the currency item with a different spectral profile, and wherein each image of the currency item represents a spectral response of the currency item to a spectral profile of a respective light source of the plurality of light sources of the illumination subsystem; and
process the plurality of images to validate the currency item in a currency validation mode, wherein the CVAL device is capable of operating in either an indicia-reading mode or the currency validation mode, and wherein, to adjust a mode of operation, the processor is configured to:

analyze at least one captured image for an indicia item;

detect the presence or absence of the indicia item within the at least one captured image;

wherein if the indicia item is detected in the at least one captured image, operate the CVAL device in the indicia-reading mode, wherein images are automatically acquired and processed to read indicia; and wherein if the indicia item is not detected in the at least one captured image or the currency item is detected in the at least one captured image, operate the CVAL device in the currency validation mode, wherein the images are automatically acquired and processed to validate the currency item.

2. The CVAL device according to claim 1, wherein the illumination subsystem, the imaging subsystem, and the processor are contained within:

a handheld housing, or a point of sale counter having a window onto which the currency item is placed for illumination and imaging.

3. The CVAL device according to claim 1, comprising a user-interface subsystem communicatively coupled to the processor for displaying at least one of: (i) a result of the currency validation and (ii) feedback to facilitate positioning of the currency item.

4. The CVAL device according to claim 1, further comprising a mode-selection switch communicatively coupled to the processor for placing the CVAL device into either the indicia-reading mode or the currency validation mode, wherein in the indicia reading mode the processor is configured by software to:

activate the one or more light sources in the illumination subsystem to illuminate the indicia item, capture the at least one image of the illuminated indicia item, and process the at least one captured image to decode at least one indicium.

5. The CVAL device according to claim 4, comprising an aiming subsystem communicatively coupled to the mode-selection switch and having one or more aiming-light sources and a second optical assembly for projecting (i) a first targeting pattern into the field of view when the CVAL device is in indicia reading mode and (ii) a second targeting pattern into the field of view when the CVAL device is in CVAL mode.

6. The CVAL device according to claim 5, wherein the second optical assembly of the aiming subsystem include at least one of a diffractive optical element and a shaping optical element for creating the first targeting pattern and the second targeting pattern.

7. The CVAL device according to claim 5, wherein the aiming system's one or more aiming-light sources include a first laser for radiating light for the first targeting pattern and a second laser for radiating light for the second targeting pattern.

8. The CVAL device according to claim 1, comprising a power subsystem for supplying power to the CVAL device, wherein the power subsystem includes:

a USB connector for attaching to a USB power supply, an electrical cable running between the USB connector and the CVAL device, and a storage element for storing energy from the USB power supply and supplying energy to the CVAL device when the CVAL device requires energy in excess of the USB power supply's limits.

9. A method for currency validation (CVAL), comprising:

activating one or more light sources of a plurality of light sources of an illumination subsystem in a predefined sequence to illuminate a currency item with different spectral profiles;

capturing a plurality of images of the currency item, wherein each image of the plurality of images is associated with an illumination of the currency item with a different spectral profile, and wherein each image of the currency item represents a spectral response of the currency item to a spectral profile of a respective light source of the plurality of light sources of the illumination subsystem;

processing the plurality of images;

validating the currency item using one or more results of the processing in a currency validation mode of a CVAL device comprising a dual-mode CVAL device capable of operating in either an indicia-reading mode or the currency validation mode; and adjusting a mode of operation in the dual-mode CVAL device by:

analyzing at least one captured image for an indicia item;

detecting the presence or absence of the indicia item within the at least one captured image;

wherein if the indicia item is detected in the at least one captured image, operating the dual-mode CVAL device in the indicia-reading mode wherein images are automatically acquired and processed to read indicia; and wherein if the indicia item is not detected in the at least one captured image or the currency item is detected in the at least one captured image, operating the dual-mode CVAL device in the currency validation mode wherein the images are automatically acquired and processed to validate the currency item.

10. The method for CVAL according to claim 9, wherein the step of processing the images comprises:

recognizing at least one of characters and features on the currency item;

identifying the currency item based on the recognized characters and features; and retrieving from memory one or more comparison standards for the identified currency item from a library of comparison standards and the step of validating the currency item comprises one of:

i) comparing the plurality of processed images to the one or more comparison standards, or ii) identifying one or more regions of interest on the currency item;

obtaining pixel levels from the one or more regions of interest from each image; and comparing the pixel levels from the one or more regions of interest to the one or more comparison standards.

11. The method for CVAL according to claim 9, wherein the step of validating the currency item comprises:

identifying multiple regions of interest on the currency item;

obtaining pixel levels each from the multiple regions of interest for each image; and comparing, for each image, the pixel levels from a particular region of interest to other regions of interest.

12. The method for CVAL according to claim 9, further comprising the step of:
providing feedback based on the CVAL indicating that the currency item is valid or invalid.

13. The method according to claim 9, wherein the method further comprises:
communicating with a point of sale system; and
if the validation finds the currency item counterfeit, then acting to gather information from the currency item and/or a customer at the point of sale system.

14. The method according to claim 13, wherein the step of acting to gather information from the currency item and/or the customer comprises at least one of:
displaying a message on a display of the point of sale system requesting a valid identification from the customer;
displaying a message on the display of the point of sale system requesting further testing of the currency item;
capturing an image of the valid identification from the customer; and
surreptitiously capturing an image of the customer using a camera that is communicatively coupled to the point of sale system.

15. The method according to claim 9, wherein the method is executed by the CVAL device,
wherein the CVAL device has an optimal position for imaging the currency item, and
wherein the method further comprises:
analyzing the plurality of captured images for aligning the currency item with the CVAL device;
providing positioning feedback to a user, wherein analyzing the plurality of captured images and providing positioning feedback to the user comprises at least one of:
analyzing the plurality of captured images to determine the currency item's position relative to the optimal position and based on the analysis, providing positioning feedback to a user to facilitate the alignment of the currency item with the optimal position; and
analyzing the plurality of captured images to determine if at least a portion of the currency item is obscured and based on the analysis, providing positioning feedback to a user indicating that the currency item is obscured.

16. The method according to claim 15, wherein providing positioning feedback comprises providing at least one of visual, audible, and/or tactile positioning feedback, an illumination of at least one visual indicator on the CVAL device, a sound generated by a speaker in the CVAL device or an image projected by the CVAL device into a field of view of the CVAL device.

17. The method according to claim 9, the method further comprising, in the indicia-reading mode:
illuminating the indicia item;
capturing the at least one image of the illuminated indicia item; and
processing the at least one captured image to decode the indicia item.

18. The method for validating the currency item according to claim 9, comprises determining fitness of a banknote, wherein the step of determining the fitness of the banknote comprises:
recognizing the denomination or series of the banknote.

19. The method for determining the fitness of a banknote according to claim 18, wherein the step of determining the fitness of the banknote comprises:
determining an age of the banknote from the recognized denomination or series of the banknote.

* * * * *